US009438428B2

(12) United States Patent
Nigriny et al.

(10) Patent No.: US 9,438,428 B2
(45) Date of Patent: Sep. 6, 2016

(54) METHOD AND SYSTEM FOR EMAIL IDENTITY VALIDATION

(71) Applicant: CertiPath, Inc., Reston, VA (US)

(72) Inventors: Jeffrey Dean Nigriny, Paeonian Springs, VA (US); Jeffrey Francis Barry, Round Hill, VA (US); Stephen P. Howard, Vienna, VA (US)

(73) Assignee: CertiPath, Inc., Reston, VA (US)

( * ) Notice: Subject to any disclaimer, the term of this patent is extended or adjusted under 35 U.S.C. 154(b) by 0 days.

(21) Appl. No.: 14/275,422

(22) Filed: May 12, 2014

(65) Prior Publication Data
US 2015/0326399 A1 Nov. 12, 2015

(51) Int. Cl.
*H04L 29/06* (2006.01)
*H04L 9/32* (2006.01)

(52) U.S. Cl.
CPC .......... *H04L 9/3263* (2013.01); *H04L 9/3247* (2013.01); *H04L 63/0823* (2013.01); *H04L 2209/68* (2013.01)

(58) Field of Classification Search
CPC ............... H04L 9/3263; H04L 9/3247; H04L 63/0823; H04L 9/3294; H04L 63/0442; H04L 9/3281; H04L 63/0428; H04L 9/32; H04L 63/12; H04L 63/08; G06F 21/10; G06F 21/33; H04N 21/8358; H04N 1/32144; H04N 2201/3233; G11B 20/00086
USPC .......................... 713/156, 170, 173, 175, 176
See application file for complete search history.

(56) References Cited

U.S. PATENT DOCUMENTS

| | | | |
|---|---|---|---|
| 6,816,965 B1 * | 11/2004 | Moore | H04L 63/0442 713/155 |
| 7,130,886 B2 | 10/2006 | Little et al. | |
| 7,188,358 B1 * | 3/2007 | Hisada | H04L 51/12 709/223 |
| 7,831,834 B2 | 11/2010 | Hickman et al. | |
| 8,073,910 B2 | 12/2011 | Tokuda et al. | |
| 8,607,361 B2 | 12/2013 | Gillum | |
| 8,843,749 B2 * | 9/2014 | Sauve et al. | 713/175 |
| 8,856,527 B1 * | 10/2014 | Schwengler et al. | 713/168 |
| 2005/0076222 A1 * | 4/2005 | Olkin | H04L 63/0442 713/176 |

(Continued)

OTHER PUBLICATIONS

S. Chokhani et al., Network Working Group, "Internet X.509 Public Key Infrastructure Certificate Policy and Certification Practices Framework", Nov. 2003, pp. 1-94.

(Continued)

*Primary Examiner* — Nirav B Patel
(74) *Attorney, Agent, or Firm* — Hunton & Williams LLP

(57) ABSTRACT

The present invention uses Server-based Certificate Validation Protocol (SCVP) to validate the public key digital signature certificate of an email signer (or the public key encryption certificate of an email recipient) by using a modified SCVP server such that a trustworthiness indicator based on certificate policies is included in an SCVP server response that maps the certificate policies asserted in the public key certificate of the email signer (or email recipient(s)) to graphically represent the degree of trust that can be attributed to the identities bound to public key certificates containing one or more certificate policies. The graphical representation of a trust level may appear directly in an email client and is based on the level of trust attributable to the binding between the public key distributed via a public key certificate (for signing or encryption) and the identity/attributes of the "subject" or "entity" contained in that certificate.

22 Claims, 15 Drawing Sheets

(56) References Cited

U.S. PATENT DOCUMENTS

| | | |
|---|---|---|
| 2005/0182938 A1 | 8/2005 | Seshadri et al. |
| 2005/0188045 A1 | 8/2005 | Katsikas |
| 2005/0228999 A1* | 10/2005 | Jerdonek et al. ............. 713/176 |
| 2006/0059346 A1* | 3/2006 | Sherman et al. ............. 713/175 |
| 2006/0271631 A1 | 11/2006 | Qureshi et al. |
| 2007/0011253 A1 | 1/2007 | Taylor |
| 2009/0063855 A1* | 3/2009 | Parkinson ..................... 713/158 |
| 2009/0106557 A1 | 4/2009 | Leonard |
| 2010/0122081 A1* | 5/2010 | Sato ...................... H04L 9/0891 713/158 |
| 2010/0169641 A1 | 7/2010 | Ristock et al. |
| 2011/0060802 A1 | 3/2011 | Katsikas |
| 2011/0231662 A1* | 9/2011 | Sato ...................... H04L 9/3268 713/176 |
| 2011/0302630 A1 | 12/2011 | Nair et al. |
| 2012/0167174 A1 | 6/2012 | Saxena et al. |
| 2012/0167233 A1 | 6/2012 | Gillum |
| 2013/0086187 A1 | 4/2013 | Cohen et al. |
| 2013/0117558 A1* | 5/2013 | Metke et al. ................. 713/156 |
| 2013/0159703 A1* | 6/2013 | Himawan et al. ............ 713/156 |
| 2013/0333028 A1 | 12/2013 | Hagar et al. |

OTHER PUBLICATIONS

T. Freeman et al., Network Working Group, "Server-Based Certificate Validation Protocol (SCVP)", Dec. 2007, pp. 1-89.

B. Ramsdell et al., Internet Engineering Task Force (IETF), Secure/Multipurpose Internet Mail Extensions (S/MIME) Version 3.2 Message Specification, http://tools.ietf.org/html/rfc5751, Jan. 2010, pp. 1-32.

D. Cooper et al., Network Working Group, Internet X.509 Public Key Infrastructure Certificate and Certificate Revocation List (CRL) Profile, http://tools.ietf.org/html/rfc5280, May 2008, pp. 1-105.

* cited by examiner

Fig. 10

METHOD AND SYSTEM FOR EMAIL IDENTITY VALIDATION

FIELD OF THE INVENTION

The field of the present invention relates generally to a method and system for validating and graphically representing the trustworthiness of an identity associated with a public key certificate used for signing and/or encrypting email.

BACKGROUND

Email recipients are often spoofed by email senders masquerading as a trustworthy source. Efforts have been made to verify the true identity of email senders to aid email recipients in knowing whether to trust the source of the email. Such efforts include implementing the S/MIME standard, per RFC5751, to digitally sign emails with public key certificates issued by certification authorities that enable a recipient to verify information about an email's integrity and information about the sender, such as the sender's name, which organization issued the sender's digital certificate, or the sender's email address. Digital signatures of email senders can be validated using public key certificates, but the degree of validation is not known to the email recipient because conventional validation protocols do not take into account the degree of identity proofing performed by the certification authority that issued the public key certificate. Accordingly, an email recipient may receive a binary indication (e.g., "trusted" or "not trusted") as to the validity of a digital signature, but does not know the degree of trust that can be attributed to the digital signature. The present invention overcomes some of the problems inherent in conventional certificate validation.

BRIEF DESCRIPTION OF THE DRAWINGS

FIGS. 8-11 depict exemplary screenshots of a portal where an administrator can identify trusted roots and policy OIDs, according to an exemplary embodiment of the invention;

DETAILED DESCRIPTION OF THE INVENTION

Figure 1:
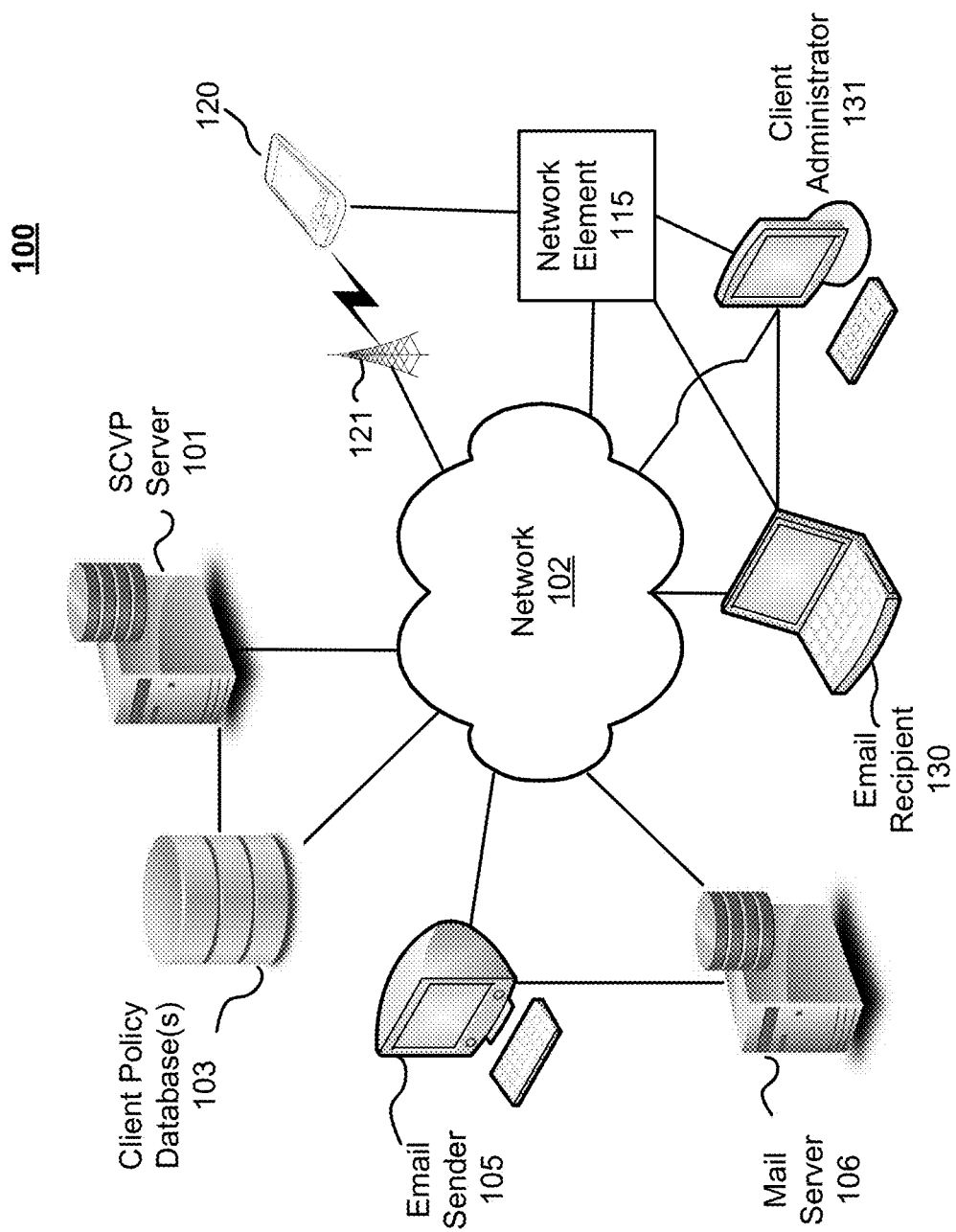
FIG. 1 depicts a block diagram of a system architecture for validating email identities, according to an exemplary embodiment.

Reference will now be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

In exemplary embodiments, the present invention leverages information in a public key certificate to identify the degree of trust that can be attributed to a digital signature made with the private key associated with that public key certificate. A digital signature is a mathematical scheme for demonstrating the authenticity of a digital message or document. A valid digital signature gives a recipient reason to believe that the message was created by a known sender, such that the sender cannot deny having sent the message (authentication and non-repudiation) and that the message was not altered in transit (integrity). A digital signature is produced by a signing algorithm that, given a message and a private key, produces the digital signature. It is computationally infeasible to generate a valid digital signature for a public key certificate holder without knowing that certificate holder's private key. The private key used by the public key certificate holder is generated by a key generation algorithm. The key generation algorithm selects a private key uniformly at random from a set of possible private keys, and outputs the private key and a corresponding public key. The authenticity of a digital signature generated from a given message and a private key can be verified by using the corresponding public key. A signature verifying algorithm takes a given message, public key and a signature, and either accepts or rejects the message's claim to authenticity to thereby verify a digital signature.

Digital signatures are used in the context of a public key infrastructure (PKI), which is a set of hardware, software, people, policies, and procedures needed to create, manage, distribute, use, store, and revoke digital certificates (a.k.a., public key certificate). A public key certificate is an object that uses a digital signature to bind a public key with an identity (such as a person, organization, address, email address, account, device, or website) with attributes of that entity (such as a role, title, or creditworthiness information). A certificate is used by an "asserting party" (i.e., the party with access to the private key of the public key certificate) or "relying party" that needs to use, and rely upon the accuracy of, the binding between the public key distributed via that certificate and the identity/attributes of the "subject" contained in that certificate. Typically, the subject, not the relying party, purchases or freely acquires their certificates from a certification authority (CA). The subject will often utilize the cheapest issuer (CA), which may follow lower quality processes/practices (e.g., identity proofing) when binding the public key to the subject's identity/attributes. The degree to which a relying party can trust the binding embodied in a certificate depends on several factors. These factors can include the practices followed by the certification authority (CA) in authenticating the subject and the CA's operating policy, procedures, and security controls, for example.

A public key certificate is typically in the form of an X.509 certificate, and typically contains the following fields: (i) a serial number, which is used to uniquely identify the certificate from other certificates issued by each individual CA; (ii) a subject, which identifies the person or entity to which the certificate is issued; (iii) a signature algorithm, which is used to create the signature; (iv) a signature, which is the actual signature used to verify that it came from the certificate issuer; (v) an issuer field, which identifies the entity (CA) that verified the information and issued the certificate; (vi) a valid-from field, which is the date the certificate is first valid from; (vii) a valid-to field, which is the expiration date of the certificate; (viii) a key-usage field, which identifies the purpose of the public key (e.g., digital signature, authentication, or encryption); (ix) a public key field, which contains the public key; (x) a thumbprint algorithm, which is the algorithm used to hash the public key certificate; and (xi) a thumbprint or fingerprint, which is the hash itself, used as an abbreviated form of the public key certificate. Per RFC3647, a Version 3 X.509 certificate may optionally contain a field declaring that one or more specific certificate policies apply to that certificate. Certificate policies may be included as a technical mechanism for a CA to assert the degree of trustworthiness that the holder of an X.509 certificate is who they claim to be. A CA that issues high assurance public key certificates normally requires that all X.509 certificates issued by the CA include certificate policies to assert the degree of trust relying parties should assume when accepting the CA's X.509 certificates. The present invention uses a validation engine and corresponding protocol, such as Server-based Certificate Validation Protocol (SCVP), to validate the public key certificate of an email signer by using the standards-based validation techniques listed in RFC5280. The present invention modifies the SCVP server such that certificate policies are identified in an SCVP server response, and the certificate policies asserted in the X.509 certificate (public key certificate) of the email signer are mapped to graphically represent the degree of trust that (if signature validation succeeds) can be attributed to digital signatures produced with that X.509 certificate containing the certificate policy.

A certificate policy may be represented in a certificate by a unique number called an "object identifier" (OID) which is a numerical sequence that typically represents the identity proofing and container protecting the private key done by the CA to issue a certificate. An OID, may be accompanied by a pointer, or link, to a uniform resource locator (URL), for example, containing the applicable text of the certificate policy that explains the controls used by the CA during identity proofing and issuance. An OID is managed by the organization that operates an issuing CA under a specific certificate policy to a public registry, which may be viewed by relying parties attempting to determine trustworthiness of a credential, but this is not typically done due to the complexity of certificate policies. One or more certificate policies may be identified in any certificate, and the certificate may include a policy or policies that only apply in particular circumstances. For example, one policy may apply when email messages are sent within a particular community, such as within a particular organization. Another policy or policies may apply only when an email is sent outside of the particular community.

The certificate policy extension in an X.509 certificate may identify whether any (or what type of) certificate policies apply. The certificate policies extension may list certificate policies that the certification authority declares are applicable to the certificate issued by the certification authority. Certificates issued by one certification authority to another certification authority (i.e., a CA-certificate), may contain a policy mapping(s) extension. This field extension allows a certification authority to indicate that certain policies in its own domain can be considered equivalent to certain other policies in the other (subject) certification authority's domain. Equivalent policies can be determined by evaluating various technical constraints present as fields in CA certificates.

As referred to above, an exemplary embodiment of the present invention uses SCVP in a novel way to graphically represent the degree of trust that can be attributed to digital signatures produced with the email sender's X.509 certificate. SCVP is an Internet protocol for determining the path between an X.509 digital certificate and a root trusted by the relying party (Path Discovery) and the validation of that path (Path Validation) according to a particular validation policy. When a relying party receives a digital certificate and needs to decide whether to trust the certificate, it first needs to determine whether the certificate can be linked to a trusted CA certificate (a.k.a 'Root Certificate', or 'Trust Anchor'). This process may involve chaining the certificate back through several connected issuers. For example, assume recipient R ("relying party") receives an email from sender S ("asserting party") that is digitally signed by sender S. The digital signature accompanying the email from sender S includes a certificate. Accordingly, it may be said that recipient R receives sender S's certificate. Recipient R may be able to determine that sender S received the certificate from Certification Authority A (CA_A), which in turn received the certificate from another well-known Bridge Certification Authority B (CA_B), which in turn also received a certificate from a Root CA (CA_C) that is trusted by recipient R. Hence, the certificate path may be sender S's certificate→CA_A→CA_B→CA_C. Recipient R trusts CA_C, and through the transitive property of the connection between CA_A and CA_C, recipient R is able to determine the trust relationship between sender S's certificate and a trusted Root CA (CA_C). The process of chaining a certificate back through several issuers to a Root CA is termed "path discovery" and the resulting chain is called a "certification path." Although the ultimate issuer of a certificate may be well-known, one or more links in the chain may be less well-known, or contain a large number of technical constraints on trust, and therefore are difficult to verify. Rather than constructing a certification path itself, recipient R may rely on an SCVP server to do this task. SCVP provides a standards-based client-server protocol for determining the path between the sender's X.509 digital certificate and a root trusted by the recipient, and SCVP does this through path discovery, as understood by those of ordinary skill in the art. A validation request is any method for querying a trusted server for information about a public key certificate, an end-entity, or CA certificate. The trusted server may be in the form of an SCVP server. An SCVP server comprises a database of X.509 certificates, which enables the SCVP server to construct certification paths. The SCVP server may obtain the certificates in its database from the various certification authorities. The process of path discovery involves the SCVP client (i.e., the relying party) sending a request (a.k.a, validation request, or specifically, an SCVP request) to the SCVP server to validate the certificate received by the relying party. The SCVP client's request contains the sender's certificate that the client is attempting to verify from which the SCVP server will begin the certification path chain. The SCVP server searches its database of X.509 certificates to "discover" the issuers of each certificate(s) until a complete certification path is created. In this manner, the SCVP server is able to construct a certification path for the end-entity certificate that was included in the SCVP request.

The SCVP server will then construct and send a response to the SCVP client/relying party. The SCVP response sometimes includes the set of certificates making up a valid path between the certificate in question and the trusted certificates. The response may also contain proof of revocation status, such as Online Certificate Status Protocol (OCSP) responses, for the certificates in the path. SCVP responses that contain certification path information are referred to as "Delegated Path Discovery" (DPD) responses. Once a certification path has been constructed, it needs to be validated. Validation can be done locally by the client (using a DPD type response) or entirely by the SCVP server using a Delegated Path Validation (DPV) type response. DPV comprises offloading to a trusted server the work involved in validating a public key certificate, and a DPV type response typically only includes a "valid" or "not valid" indicator, thereby saving on transaction bandwidth. An SCVP server operating in DPV mode combines certificate information supplied by the client with certificate path and revocation status information obtained by the DPV server. In this manner, the DPV server is able to apply complex validation policies that are prohibitive for each client to perform.

Assuming that the certification path constructed by the SCVP server is valid, the SCVP server will send a response with information indicating whether the certificate is valid (e.g., a DPV response). Typically, this is the only information included in a DPV type SCVP response. However, the SCVP server can be modified such that additional information is included in its SCVP responses. Embodiments of the present invention modify the SCVP server to force the SCVP server to refer to a client policy database before constructing an SCVP response, such that the SCVP server will include additional information in the SCVP response. In one exemplary embodiment, a database comprising client policies is communicatively coupled to the SCVP server. The client policies may be defined by an administrator associated with the client/relying party (e.g., an administrator at the client's employer). For example, an administrator may define a client policy to state that certificates issued from certification authorities under CA_C (from the above example) are trusted by the client (i.e., trusted by the client's employer). In other words, the administrator may specify that CA_C is a "trusted root." Each trusted root may have varying degrees of identity proofing or levels of assurance that are used when issuing certificates. According to exemplary embodiments of the present invention, a client policy may identify which levels of assurance (i.e., "policy OIDs" that are used by the root) that the client is willing to trust, and may also categorize these identified levels of assurance/policy OIDs into different categories. For example, a trusted root's level of assurance/policy OID that required biometric identification of the "subject" or "end-entity" before the subject/end-entity received a certificate from any issuing CA under that root may be categorized into a high trust or "green" category. Similarly, a trusted root's level of assurance/policy OID that simply required credit card authorization of the subject/end-entity to receive a certificate from the trusted root may be categorized as an intermediate or "yellow" category, for example. An administrator on the client-side may specify any number of trusted roots and corresponding trusted OIDs. By specifying the trusted roots and corresponding trusted OIDs (for each trusted root), the client is instructing the SCVP server to compare the root(s) and policy OIDs in the subject/end-entity certificate to the expressly trusted roots and policy OIDs before sending a DPV response back to the client in reply to an SCVP request. Information in the form of an identifier indicating the category of the subject/end-entity certificate may be included in addition to the standard DPV response by the modified SCVP server.

Upon receiving an SCVP request from the client, the SCVP takes the certification authority identified in the sender's certificate and tries to construct a certification path back to a root trusted by the relying party/recipient. Additionally and importantly, the SCVP server compares the mapped policy OIDs in the sender's certificate to policy OIDs of the roots expressly trusted by the relying party/recipient. In other words, in addition to constructing a certification path, the SCVP server refers to the trusted roots and trusted policy OIDs identified by the relying party (and stored in a client policy database) and compares these to the policy OIDs of issuing authorities in the constructed certification path and, particularly, to the certification authority identified in the sender's certificate. In this manner, the SCVP server determines which client policies are satisfied by the sender's certificate. Based upon this determination/comparison, the SCVP server appends degree of trust information to a response. This degree of trust information may identify the policy OID(s) that satisfy the client's required assurance levels (i.e., the expressly trusted policy OIDs per trusted root) and may also identify the corresponding trust category specified by an administrator on the client-side (e.g., 3, 2, 1, or high, medium, low). Again, a typical SCVP response only includes information indicating whether the sender's certificate is valid (e.g., valid/invalid). However, by forcing the SCVP server to refer to a client policy database and determine which client policies are satisfied by the email sender's certificate, the actual response from the SCVP server can include additional information that is not typically included, namely, degree of trust information.

This degree of trust information corresponds to the degree to which a relying party can trust the binding embodied in the certificate (i.e., the binding between the public key distributed via that certificate and the identity/attributes of the "subject" contained in that certificate). In other words, the degree of trust information reflects how likely the sender (e.g., sender S) is who they claim to be. The degree of trust information is based on the practices followed by the certification authority when issuing the certificate.

One certification authority, such as a commercial issuer of certificates, may only verify credit card information before issuing a certificate to a purchaser. Other certification authorities may require more rigorous information be collected and verified before issuing a certificate to a recipient/purchaser, and still others provide certificates without charge and without verification of any kind By way of example, a large company or government agency that creates certificates for its employees may verify employment status, driver's license information (e.g., name, address, birth date, driver's license identifier), passport information (e.g., full name, nationality, birth date, place of birth, gender), social security number, and/or tax identification number, for example. The verification performed by a certification authority may be referred to as "identify proofing," and the extent of identity proofing performed by a certification authority may be included in one or more certificate policies in the X.509 certificate and in the "degree of trust information" that was attached onto the SCVP response by the "modified SCVP server."

Figure 14:
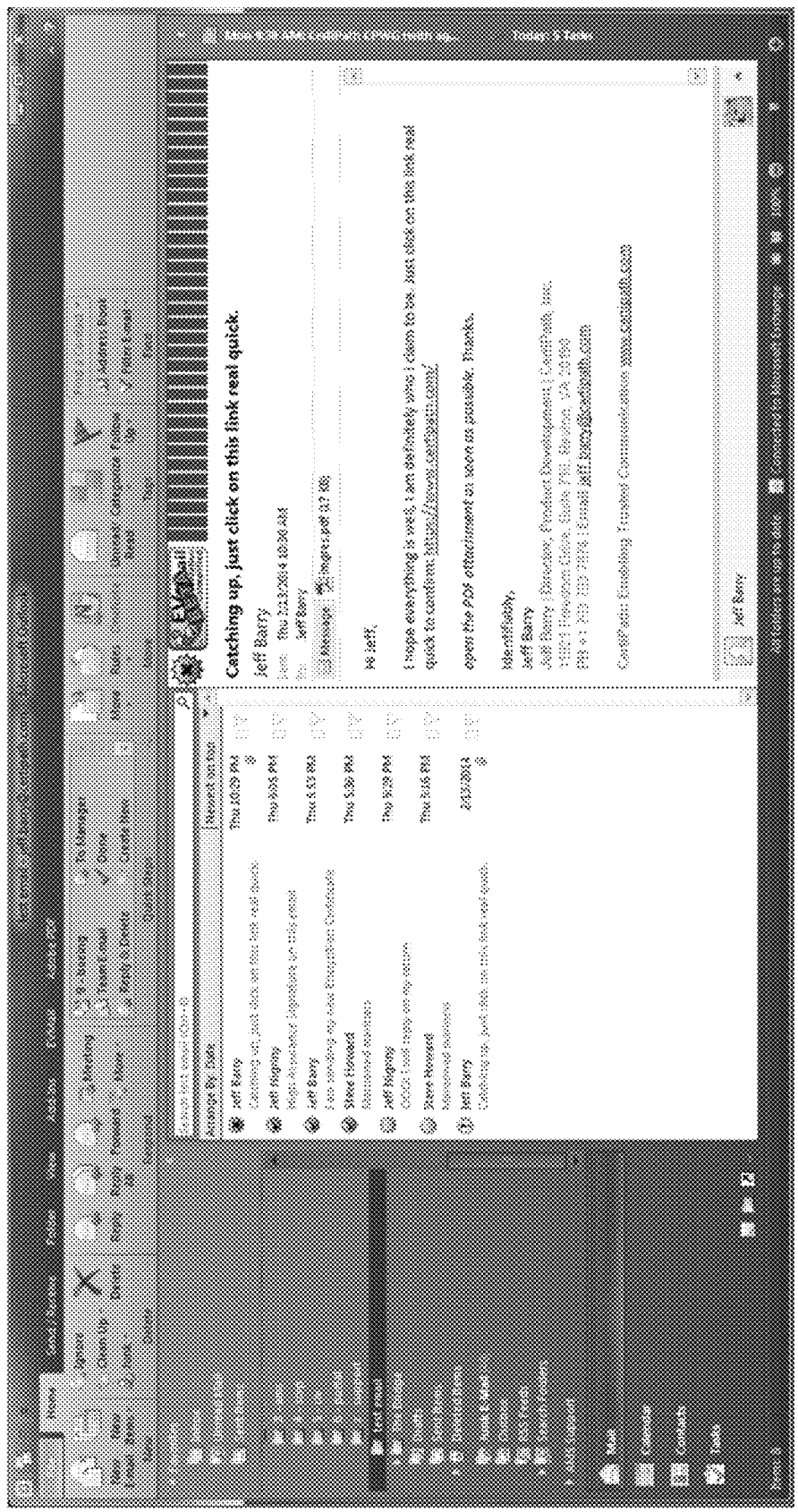
FIG. 14 depicts an exemplary screenshot of a graphical representation of a trust level associated with the identity of an email sender, according to an exemplary embodiment of the invention.

Submission of an SCVP request and receipt of an SCVP response may all be done automatically by the SCVP client and SCVP server, such that the client (e.g., recipient R) that received the email (e.g., from sender S) need not take any action to initiate the email validation process. Once the SCVP response is received at the SCVP client (e.g., recipient R's workstation), the "degree of trust information" that was attached onto the SCVP response by the "modified SCVP server" is translated into a graphical representation that is easily understood by the user/email recipient. An exemplary graphical representation of a low degree of trust is shown in FIG. 14.

The degree of trust information may be translated into visual icons and/or a trust bar indicator or other forms of graphical or numerical representations. For example, a low level of validity (e.g., level 1) may correspond to a red "χ"; a mid-level of validity (e.g., level 2) may correspond to a yellow "!"; and a high level of validity (e.g., level 3) may correspond to a green "✓". Alternatively or additionally, a trust bar indicator may be used that combines a number of bars with color. For example, if there is room for 10 bars in an email program, a low level of validity may correspond to zero to three bars in a red color; a mid-level of validity may correspond to four to seven bars in a yellow color, and a high level of validity may correspond to eight to ten bars in a green color. Any number of symbols, bars, graphics, and/or colors may be used to aid the email recipient in readily understanding the degree of trust that may be attributed to the sender's identity. Reference will now be made to the figures to explain exemplary embodiments of the present invention.

Referring to FIG. 1, a schematic diagram of a system 100 for validating identities of email senders 105 or email recipients 130 is shown, according to an exemplary embodiment. As illustrated, network 102 may be communicatively coupled with one or more data transmitting devices or entities, databases, network element 115, or wireless transceiver 121. Exemplary data transmitting devices or entities include SCVP server 101, email sender 105, mail server 106, email recipient 130, client administrator 131, or mobile device 120, for example. Exemplary databases may include client policy database(s) 103, for example. These and other types of data transmitting devices/entities and databases may be communicatively coupled directly with network 102 or via one or more intermediary devices, such as transceiver 121 or network element 115.

It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). Module or server functionality of architecture within system 100 may be located on a single device or distributed across a plurality of devices including one or more centralized servers and one or more mobile units or end user devices.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cellular network, corporate networks, municipal networks, government networks, or home networks.

SCVP server 101 may be a server for implementing server-based certificate validation protocol (SCVP), which carries out certification path building and certification path validation for a client (e.g., email recipient 130 or email sender 105). Path building and validation (e.g., making sure that none of the certificates in the path are revoked) are performed according to a validation policy, which contains one or more trust anchors. SCVP server 101 may more generally be considered a validation engine in that other types of servers may be used to carry out the exemplary embodiments of the present invention. As explained above, SCVP server 101 may be considered a "modified" SCVP server in that additional information is included in (or appended to) SCVP responses. More particularly, embodiments of the present invention force SCVP server 101 to refer to a client policy database 103 before sending back a complete SCVP response, such that the SCVP server 101 will include additional information in the SCVP response (or append additional information to the SCVP response).

Client policy database(s) 103 may store data input or specified by client administrator 131. For example, trusted roots and trusted policy OIDs identified by client administrator 131 may be identified and/or stored in client policy database(s) 103. More particularly, data in the client policy database(s) 103 may be indexed according to client (e.g., email recipient 130, email sender 105, or an entity associated with email recipient 130/email sender 105). In other words, information from each client (e.g., a client administrator associated with the client) may be organized according to a client or entity identification. Such information may include the roots (i.e., certification authorities) that have been selected as "trusted" by the client administrator, for example. Such information may also include particular policy OIDs of the trusted roots, and these particular policy OIDs may be organized into various trust categories (e.g., good/green, intermediate/yellow, and/or bad/red, for example).

Mail server 106 may be a server or mail transfer agent (MTA) for transferring electronic mail messages (e.g., email) from a computer (e.g., email sender 105). Mail server 106 may implement both the client and server portions of the Simple Mail Transfer Protocol (SMTP).

Email Sender 105 and/or email recipient 130 may be a desktop computer, a laptop computer, a tablet, a server, a personal digital assistant, or other computer capable of sending or receiving network signals. A user of devices identified as email sender 105 and/or email recipient 130 may generally be referred to as email sender 105 and/or email recipient 130, respectively. Email sender 105 and/or email recipient 130 may use a wired or wireless connection. Mobile device 120 is included in FIG. 1 to emphasize the fact that email sender 105 and/or email recipient 130 may be a portable electronic device capable of being transported. In other words, mobile device 120 may be considered an email sender and/or email recipient depending on whether a user is using mobile device 120 to send or receive emails, respectively.

Mobile device 120 may be a mobile communications device, a smartphone, a tablet computer, a wearable computer such as in the form of a wrist watch, bracelet, or glasses, a home phone, a cellular phone, a mobile phone, a satellite phone, a personal digital assistant, a computer, a handheld multimedia device, a personal media player, a gaming device, a mobile television, or other devices capable of sending messages such as email and communicating with network 102 or transceiver 121. Mobile device 120, email sender 105, and email recipient 130 may connect to network 102 and communicate with other network elements, servers or providers using WiFi, 3G, 4G, Bluetooth, or other chipsets.

Transceiver 121 may be a repeater, a microwave antenna, a cellular tower, or another network access device capable of providing connectivity between different network mediums. Transceiver 121 may be capable of sending or receiving signals via a mobile network, a paging network, a cellular network, a satellite network or a radio network. Transceiver 121 may provide connectivity to one or more wired networks and may be capable of receiving signals on one medium such as a wired network and transmitting the received signals on a second medium, such as a wireless network.

Client administrator 131 may be a desktop computer, a laptop computer, a tablet or other mobile device, a server, a personal digital assistant, or other computer capable of sending or receiving network signals. Client administrator 131 may be associated with email recipient 131 (or email sender 105) such as being part of the same organization of email recipient 131 (or email sender 105). For example, client administrator 131 may be an IT administrator at an organization that employs email recipient 131 (or email sender 105). Client administrator 131 is shown as being directly communicatively coupled with email recipient 130. However, another client administrator may be directly communicatively coupled with email sender 105, and such client administrator may perform similar functions as client administrator 131 in the context of one embodiment of the present invention.

Network element 115 may include one or more processors (not shown) for recording, transmitting, receiving, or storing data. Network element 115 may transmit and receive data to and from network 102. The data may be transmitted and received utilizing a standard telecommunications protocol or a standard networking protocol. For example, data may be transmitted or received utilizing Transmission Control Protocol/Internet Protocols ("TCP/IP"), hypertext transfer protocol ("HTTP"), hypertext transfer protocol secure ("HTTPS"), real time streaming protocol ("RTSP"), Wireless Application Protocol ("WAP"), Multimedia Messaging Service ("MMS"), Enhanced Messaging Service ("EMS"), Global System for Mobile Communications ("GSM") based systems, Code Division Multiple Access ("CDMA") based systems, text messages and/or a Short Message Service "SMS," Session Initiation Protocol ("SIP"), Voice Over IP ("VoIP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Figure 2:
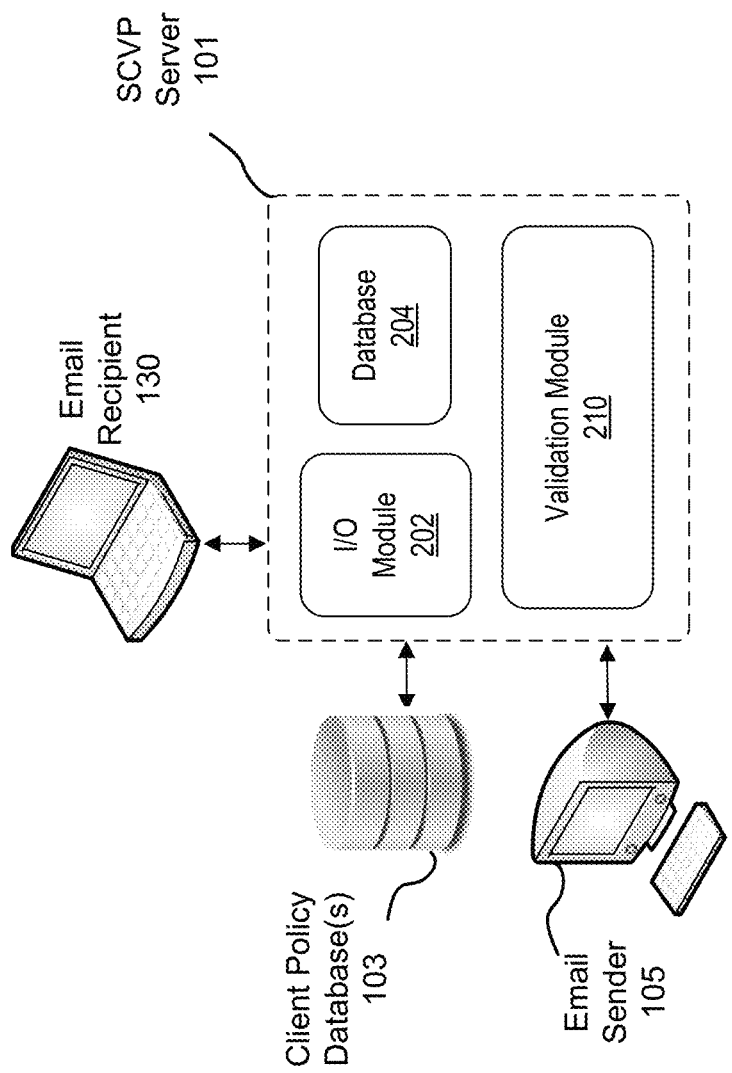
FIG. 2 depicts a block diagram of an exemplary SCVP server, according to an exemplary embodiment of the invention.

With reference to FIG. 2, an exemplary SCVP server 101 is shown. SCVP server 101 may comprise an I/O module 202, database 204, and validation module 210, for example. I/O module 202 may be configured to receive and transmit data to and from SCVP server 101. For example, SCVP requests from email recipient 130 and/or email sender 105 may be received by SCVP server 101 via I/O module 202 and network 102, for example. Additionally, SCVP responses, including any appended information, may be sent by I/O module 202 to email recipient 130 or email sender 105. Database 204 may comprise various forms of data, including but not limited to X.509 certificates, that may be used to construct a certification path. Validation module 210 may be configured to construct a certification path, an SCVP response, and/or degree of trust information in response to an SCVP request. Importantly, SCVP server 101 may refer to client policy database(s) 103 for the purpose of constructing and appending degree of trust information to an SCVP response.

As explained above, client policy database(s) 103 may identify the trusted roots (i.e., certification authorities) and particular policy OIDs of the trusted roots that have been selected as "trusted" by the client administrator 131, and these particular policy OIDs may be organized into various trust categories (e.g., good/green, intermediate/yellow, and/or bad/red, for example). SCVP server 101 may refer to information in client policy database(s) 103 to construct an SCVP response and/or to construct information to append to an SCVP response. I/O module 202 may be configured to access and/or retrieve data from client policy database(s) 103.

Figure 3:
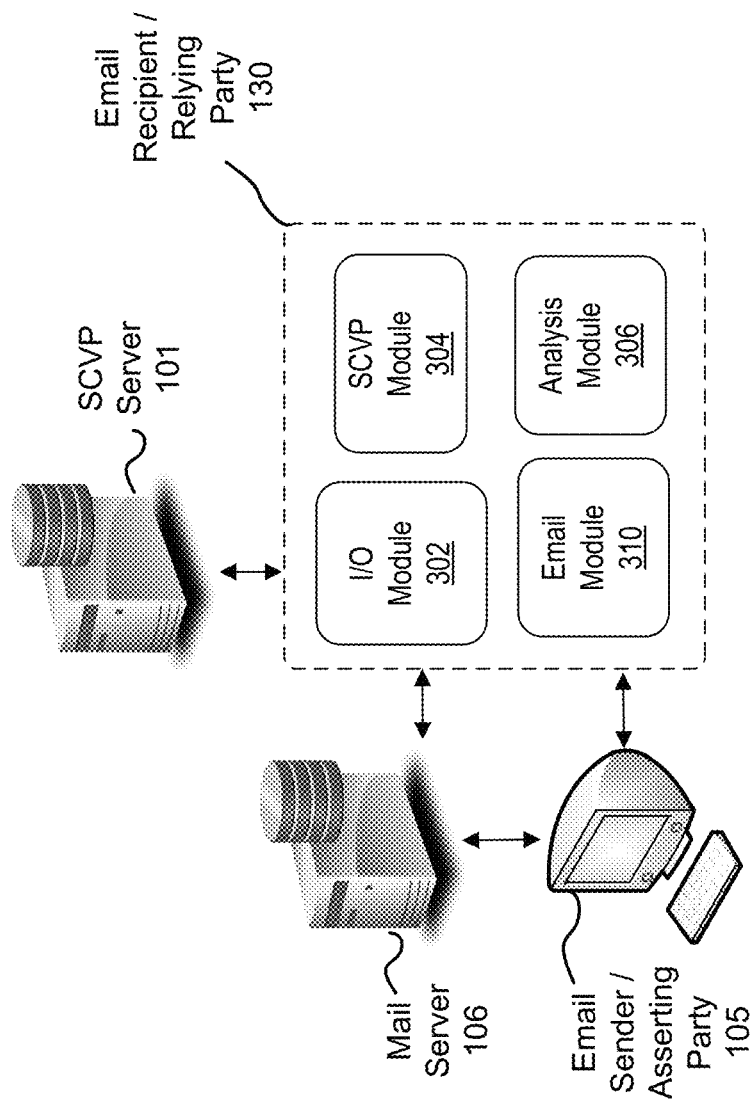
FIG. 3 depicts a block diagram of an exemplary email recipient, according to an exemplary embodiment of the invention.

With reference to FIG. 3, an exemplary workstation of email recipient 130 is shown. The email recipient's workstation may comprise an I/O module 302, an SCVP module 304, an analysis module 306, and an email module 310, for example. I/O module 302 may be configured to receive and transmit data to and from email recipient 130. For example, emails from mail server 106 and/or email sender 105 may be received by email recipient 130 via I/O module 302 and network 102, for example. SCVP module 304 may be configured to construct and send SCVP requests and responses from SCVP server 101, via I/O module 302 and network 102, for example. An SCVP request may be submitted to SCVP server 101 upon receipt of an email from email sender 105. Responses from SCVP server 101 may be received at SCVP module 304 via I/O module 302, and all or a portion of such responses may be transmitted to analysis module 306.

Analysis module 306 may be configured to analyze all or a portion of the response from SCVP server 101 that was sent in response to an SCVP request. For example, analysis module 306 may receive the degree of trust information appended to a DPD or DPV SCVP response. Analysis module 306 may analyze the degree of trust information and determine which trustworthiness level should be displayed to inform email recipient 130 (or a user thereof) as to the trustworthiness level of the certificate that was used to sign the email from email sender 105. Accordingly, analysis module 306 may analyze or evaluate all or a portion of the response from SCVP server 101, and instruct email module 310 as to which graphical representation to display to represent the degree of trust information.

Email module 310 may be configured to display emails and contents of emails to email recipient 130. For example, email module 310 may be considered an email client, email reader, or a mail user agent (MUA) that may be used by email recipient 130 to access and manage the client's/user's email. Additionally, however, contrary to conventional email clients, email module 310 may be configured to output a graphical representation of the degree of trust information. Email module 310 may be instructed by analysis module 306 as to which graphical representation to display within the mail user agent to inform the email recipient as to the trustworthiness of the email sender's identity. Email recipient 130 may review/interpret this graphical representation before deciding whether to read/open the email from email sender 105, and/or whether to read/open an attachment included with the email from email sender 105.

Analysis module 306 may also be configured to move emails from email sender 105 based on the analysis of the degree of trust information. For example, if an analysis of the degree of trust information yields a determination that the email sender's identity cannot be trusted, analysis module 306 may be configured to move that particular email to a junk/spam folder, or delete the message all together as a response to a user-defined threshold for the degree of trust information. Analysis module 306 may also be configured to instruct email module 310 to output an alert to email recipient 130 that an email has been placed in a junk/spam folder, and such alert may also include a link to the junk/spam folder, particularly if such folder is located remote to the email recipient's computer 130.

Additional details of an email recipient 130 verifying the identity of an email sender 105 is provided below. However, in a related alternative embodiment, the identity of the email recipient 130 may be verified by the email sender 105 using features of the present invention. As mentioned above, digital signatures use the private key of the email sender 105 to sign the message/email and the email recipient 130 uses the email sender's public key to verify the signature. However, the inverse may also occur, such as when an email is encrypted. The public key of the email recipient 130 is used in order to encrypt the message and the email recipient's private key is used to decrypt the message. When the sender places the intended recipient(s)' email address(es) within an email for which encryption has been selected, the email software fetches the public key certificate that it believes to be associated with the recipient for encryption purposes. Just as signature certificate association/binding with the sender is often dubious, so too is the association of an encryption certificate with a recipient. This creates an opportunity and need to verify the identity of the recipient to whom the sender wishes to send an encrypted email. In basic terms, the same process may be performed as above with regard to information in the email sender's certificate. However, in this related alternative embodiment, information in the encryption certificate, rather than the signature certificate, is analyzed to determine the likelihood that the fetched encryption certificate accurately represents the intended email recipient 130.

Figure 4:
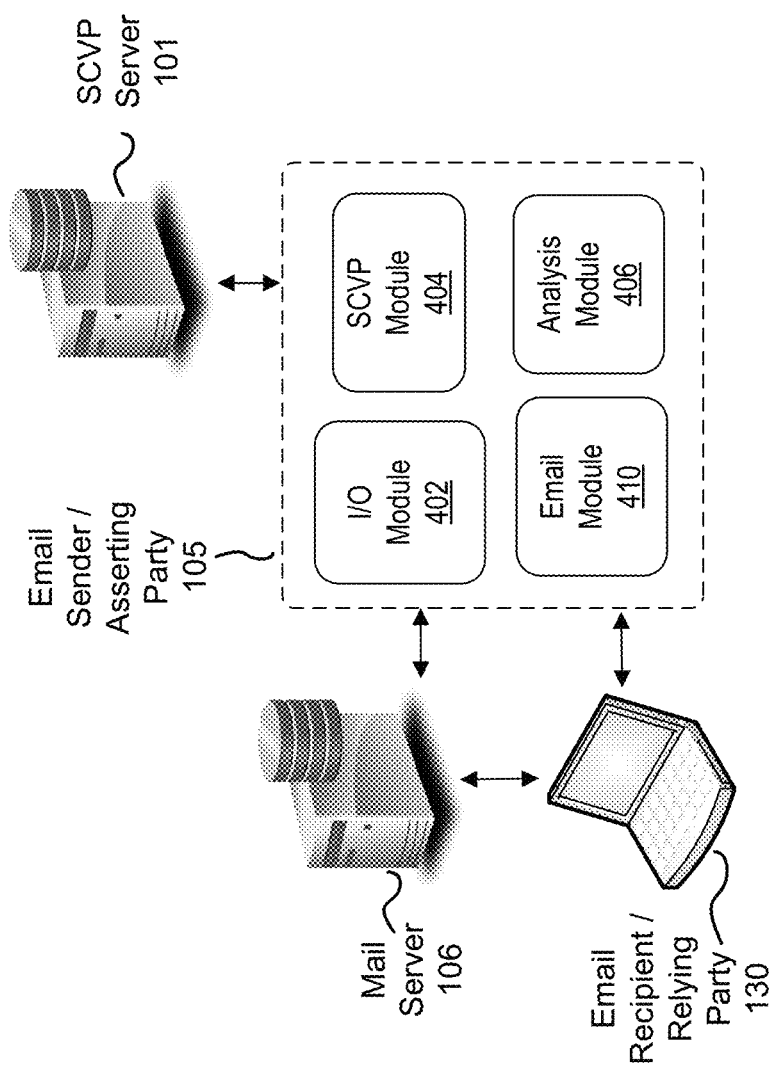
FIG. 4 depicts a block diagram of an exemplary email sender, according to an exemplary embodiment of the invention.

With reference to FIG. 4, an exemplary email sender's workstation 105 is shown according to the exemplary alternative embodiment. The email sender's workstation may comprise an I/O module 402, an SCVP module 404, an analysis module 406, and an email module 410, for example. I/O module 402 may be configured to receive and transmit data to and from email sender 105. For example, emails sent from email sender 105 may be sent by email sender 105 via I/O module 402 and network 102, for example. SCVP module 404 may be configured to construct and send (via I/O module 402) SCVP requests relating to an encryption certificate of the email recipient 130. An SCVP request may be submitted to SCVP server 101 upon email sender 105 selecting to encrypt an email to email recipient 130. Responses from SCVP server 101 may be received at SCVP module 404 via I/O module 402, and all or a portion of such responses may be transmitted to analysis module 406.

Analysis module 406 may be configured to analyze all or a portion of the response from SCVP server 101 that was sent in response to an SCVP request. For example, analysis module 406 may receive the degree of trust information appended to an SCVP response. The degree of trust information may relate to the assurance that the identity of the email recipient 130 is tied to the email address entered by the email sender 105. Analysis module 406 may analyze the degree of trust information and determine which trustworthiness level should be displayed to inform email sender 105 as to the trustworthiness level of the encryption certificate that was issued to the email recipient 130. Accordingly, analysis module 406 may analyze or evaluate all or a portion of the response from SCVP server 101, and instruct email module 310 as to which graphical representation to display to represent the degree of trust information.

Similar to email module 310, email module 410 may be considered an email client, email reader, or a mail user agent (MUA) that may be used by email sender 105 to send emails. Additionally, however, contrary to conventional email clients, email module 410 may be configured to output a graphical representation of the degree of trust information. Email module 410 may be instructed by analysis module 406 as to which graphical representation to display within the mail user agent to inform the email sender 105 (or a user thereof) as to the trustworthiness of the email recipient's identity. For example, an email address of the email recipient 130 may turn green, yellow, or red, based upon the degree of trust information received from the SCVP server 101. An email sender may review/interpret this graphical representation before deciding whether to send the email to the email recipient 130.

Analysis module 406 may also be configured to store email addresses tied to an email recipient 130 with a questionable or trusted identity, based on the analysis of the degree of trust information. For example, if an analysis of the degree of trust information yields a determination that the email sender's identity cannot be trusted, analysis module 406 may be configured to update a contact address book to highlight the email recipient's questionable identity. Similarly, if an analysis of the degree of trust information yields a determination that the email sender's identity can be trusted, analysis module 406 may be configured to update a contact address book to highlight the email recipient's trusted identity.

Figure 7:
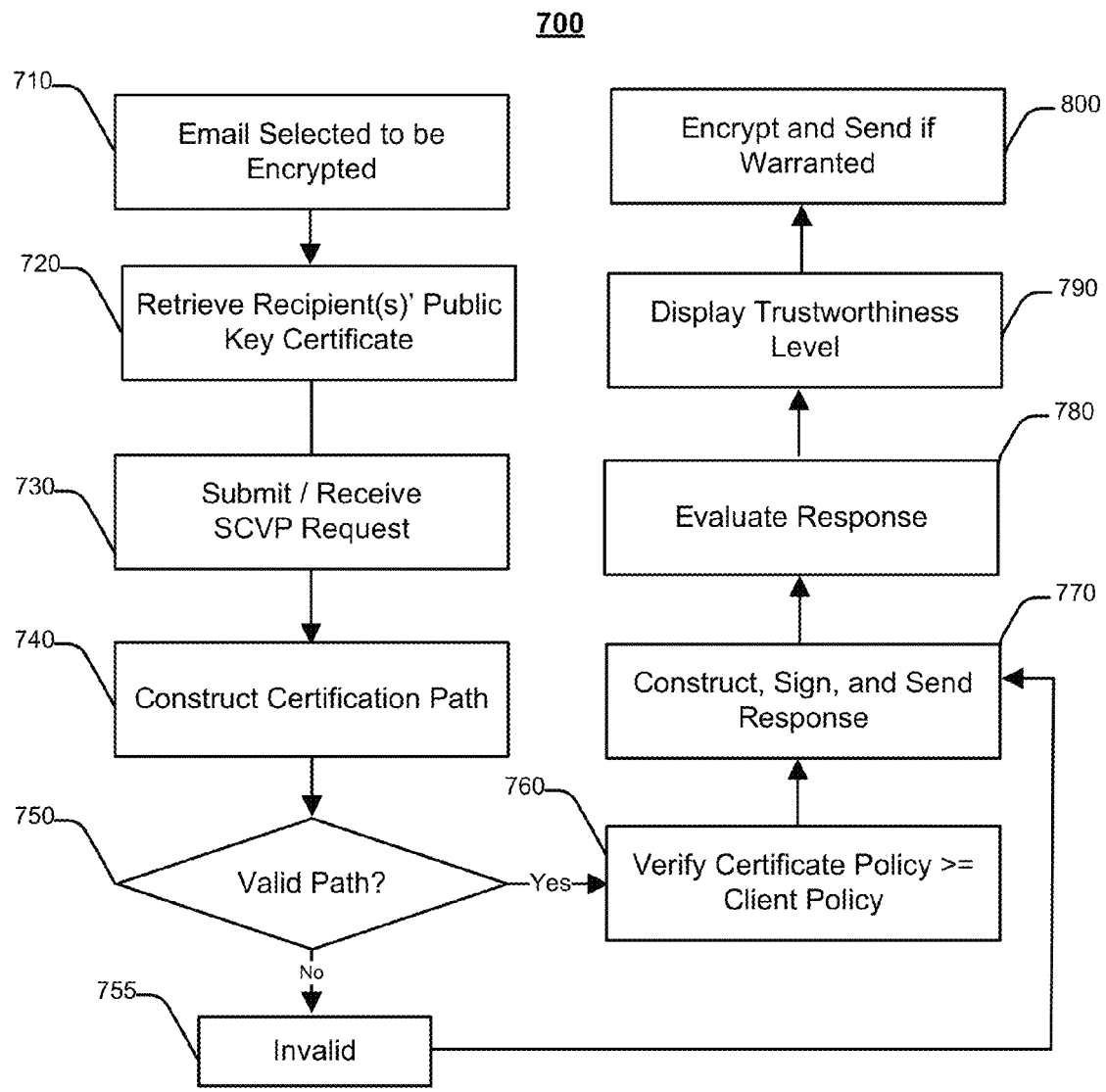
FIG. 7 depicts an illustrative flowchart of a validating the identity of an email recipient, according to an exemplary embodiment of the invention.

Additional explanation of the process for validating an email recipient's identity using the public encryption certificate is provided below with reference to FIG. 7. However, before providing such additional explanation, further details of the process for validating an email sender's identity, from the perspective of the email recipient, will be explained with reference to FIG. 5.

Figure 5:
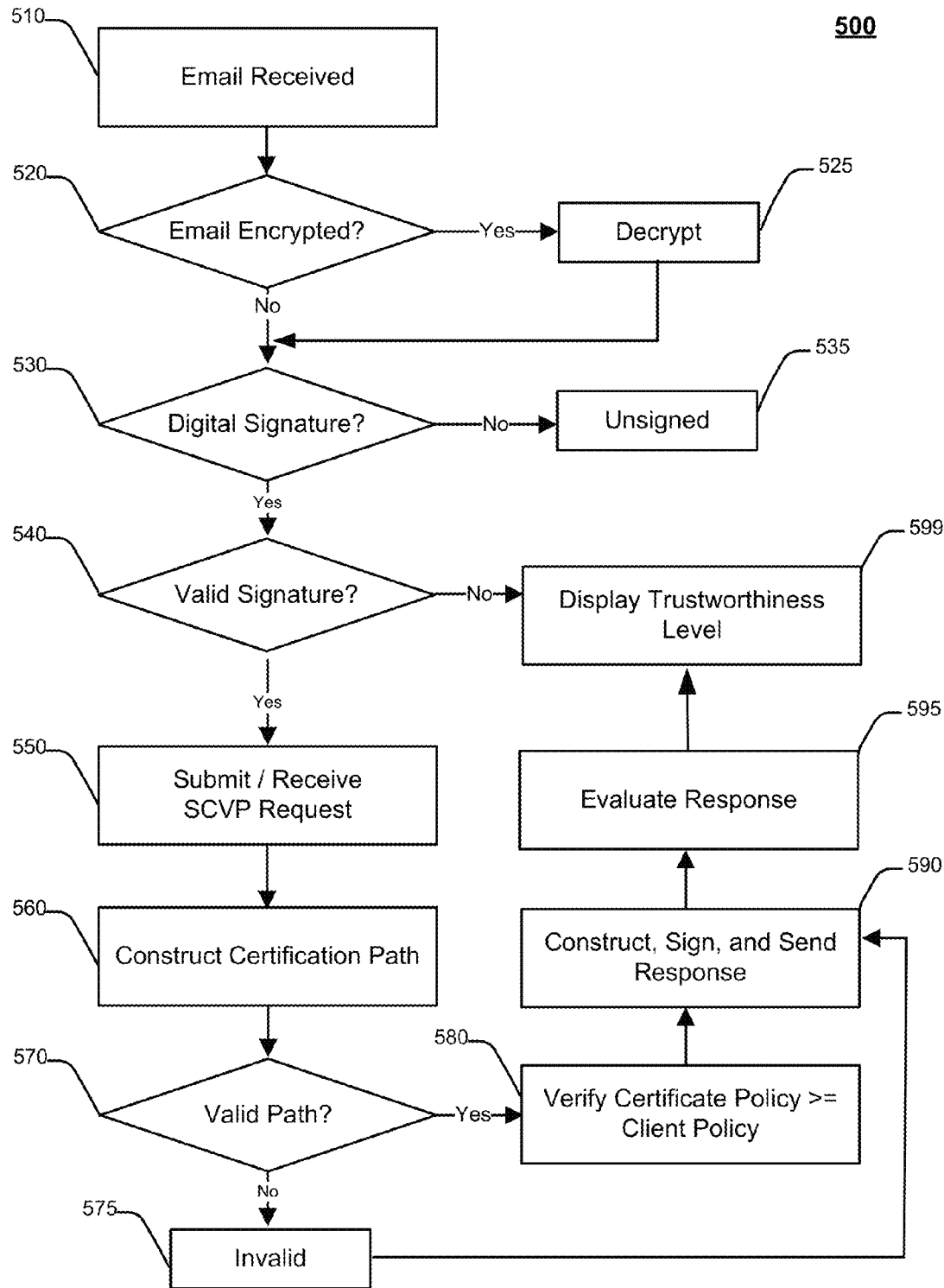
FIG. 5 depicts an illustrative flowchart of a validating the identity of an email sender, according to an exemplary embodiment of the invention.

Referring to FIG. 5, an illustrative flowchart of a method for validating a digitally signed email is shown. This exemplary method 500 is provided by way of example, as there are a variety of ways to carry out methods according to the present disclosure. The method 500 shown in FIG. 5 can be executed or otherwise performed by one or a combination of various systems and modules. The method 500 described below may be carried out by system 100 shown in FIG. 1, SCVP server 101 shown in FIG. 2, and email recipient 130 shown in FIG. 3, by way of example, and various elements of the system 100, SCVP server 101, and email recipient 130 are referenced in explaining the exemplary method of FIG. 5. Each block shown in FIG. 5 represents one or more processes, decisions, methods or subroutines carried out in exemplary method 500, and these processes, decisions, methods or subroutines are not necessarily carried out in the specific order outlined in FIG. 5, nor are each of them required. Referring to FIG. 5, exemplary method 500 may begin at block 510.

At 510, the relying party 130 may receive an email from the asserting party 105. At 520, email module 310 may determine whether the email is encrypted. If the email is encrypted, then the contents of the email and the digital certificate accompanying the email may not be read until the email is decrypted at 525. If the email is not encrypted or if the email is decrypted at 525, the process may continue to 530.

At 530, email module 310 may determine whether the email contains a digital signature. If no, then a digital signature cannot be evaluated or validated. Accordingly, at 535 a graphical representation of the trustworthiness level of the email sender may appear. An exemplary graphical representation of an unevaluated (or unevaluatable) email may appear in a gray color, for example. However, any number of graphical representations for an unevaluated email may be used, including various colors, logos, text, or numbers, for example. If the email does contain a digital signature, then the process may continue to 540.

At 540, email module 310 may determine whether the digital signature is valid using conventional methods. For example, email module 310 may determine whether the digital signature has been tampered with, using conventional methods. If email module 310 determines that the sender's digital signature is invalid, then the process may continue to 620 and email module 310 may display a trustworthiness level of the email sender based on the invalid digital signature. An exemplary graphical representation of an email having an invalid digital signature may appear in a red color and/or a (red) "χ", for example. However, any number of graphical representations for an invalid digital signature associated with a received email may be used, including various colors, logos, text, or numbers, for example. If email module 310 determines that the sender's digital signature is valid, then the process may continue to 550.

At 550, SCVP module 304 of email recipient 130 may prepare and submit an SCVP request and SCVP server may receive the SCVP request from email recipient 130 via network 102. The purpose of the SCVP request may be to have SCVP server 101 construct a certification path using the sender's certificate, as well as to have the SCVP server 101 construct degree of trust information. The SCVP request may comprise the sender's certificate that the client is attempting to verify, from which the certification path is to begin.

At 560, SCVP server 101 may construct a certification path for the certificate that was used to digitally sign the email. The SCVP server searches its database 204 of X.509 certificates to discover issuers of the certificate, including the root or trust anchor, and any number of intermediate certification authorities (i.e., issuing CA or signing CA), down to the end entity or asserting party 105. After the SCVP server 101 constructs a certification path, the process may continue to 570.

At 570, the SCVP server 101 may determine whether the constructed certification path is valid. A certification path may be determined to be invalid if it is incomplete, if the certificate was used for an improper purpose (e.g., an encryption certificate was used to digitally sign an email or vice versa), if the certificate has expired, if the certificate has been revoked, or if a name constraint has been violated, for example. If SCVP server 101 determines that the certification path is invalid, then the process may continue to 575 and ultimately to 590. If SCVP server 101 determines that the certification path is valid, then the process may continue to 580.

At 580, SCVP server 101 may compare policy OIDs in the certificate to policy OIDs expressly trusted by the relying party 130 (or an entity associated with relying party 130). The expressly trusted policy OIDs of the relying party may be recorded in the client policy database(s) 103, as explained in further detail below. The policy OIDs in the sender's certificate may be compared to the expressly trusted policy OIDs using an issuing authority level mapping. Again, degree of trust information in the SCVP response is based on whether the policy OIDs in the certificate match the policy OIDs in the client policy database(s) 103. However, comparing policy OIDs is not straightforward. In addition to an entity's object identifier arc (which identifies the certification authority that issued the certificate), an entity's certificate policy OIDs will not necessarily be the same as the certificate policy OIDs of another entity. In order to compare one entity's certificate policy OIDs to another entity's certificate policy OIDs, an issuing authority level mapping is used. Issuing authorities publish certificate policy documents that explain what their various certificate policy OIDs correspond to in terms of the establishment of identity, issuance of credential, and subsequent protection of the private key. Each certificate policy OID corresponds to a specific level of assurance established by the certificate policy document across these three general activities. The specific level of assurance is based on, for example, the type of identity proofing used by the certification authority which established the identity before issuing the certificate to the end entity.

The certificate itself typically contains a pointer or link to the certificate policy document, thereby allowing a relying party to retrieve and/or review the document. It is unlikely that a relying party will review a certificate policy document of an issuer that issued an email sender's digital signature certificate. It is even more unlikely that a relying party will review several issuer's certificate policy documents so as to understand how one issuer's policy OIDs correspond to other issuers' policy OIDs.

An entity referred to as a bridge may review these certificate policy documents in detail to create an issuing authority level mapping. A "Bridge CA" defines its own certificate policy OIDs and then compares the certificate policy OIDs of several issuers, by referring to the corresponding certification policy document, in order to create a logical mapping between certificate policy OIDs for its primary function as a CA. For example, a bridge (e.g., The CertiPath Bridge CA) may define a medium-level hardware based assurance as having a policy OID of "1.3.1.6.1.4.1.24019.1.1.1.2" Upon reviewing a certificate policy document for a particular issuing authority (e.g., Department of Treasury), the bridge may learn that this particular issuing authority defines a similar medium-level hardware based assurance as having a policy OID of "2.16.840.1.101.3.2.1.3.7" Upon reviewing another certificate policy document for another issuing authority (e.g., The Boeing Company), the bridge may learn that the other issuing authority defines a similar medium-level hardware based assurance as having a policy OID of "1.3.6.1.4.1.73.15.3.1.12" In this manner, the bridge may equate its policy OID of "1.3.1.6.1.4.1.24019.1.1.1.2" to Dept. Of Treasury's policy OID of "2.16.840.1.101.3.2.1.3.7" and also to Boeing's policy OID of "1.3.6.1.4.1.73.15.3.1.12" Using the transitive law, which states that if A=B and B=C, then A=C, it may be determined in this example that the Dept. of Treasury's policy OID of "2.16.840.1.101.3.2.1.3.7" is the same as Boeing's policy OID of "1.3.6.1.4.1.73.15.3.1.12." The bridge repeats this process for other types and other levels of assurance to create an issuing authority level mapping (or policy map), thereby providing a method for comparing certificate policy OIDs of various issuing authorities to each other. Other transitive relations may be relied upon to create and/or interpret an issuing authority level mapping, such as the transitive relation which states that whenever A>B and B>C, then A>C. For example, assume the bridge defines a policy OID as having an assurance level of "B" (e.g., medium-level software based assurance). Next, the bridge determines that Treasury has one or more policy OIDs having an assurance level of "C" (e.g., basic-level software based assurance) that is less than the bridge's defined assurance level of "B." The bridge also determines that Boeing has one or more policy OIDs having an assurance level of "A" (e.g., medium-level hardware based assurance) that is greater than the bridge's defined assurance level of "B." Accordingly, it may be determined that the assurance level of Boeing's level "A" policy OID(s) is (are) greater than Treasury's level "C" policy OID(s).

Figure 15:
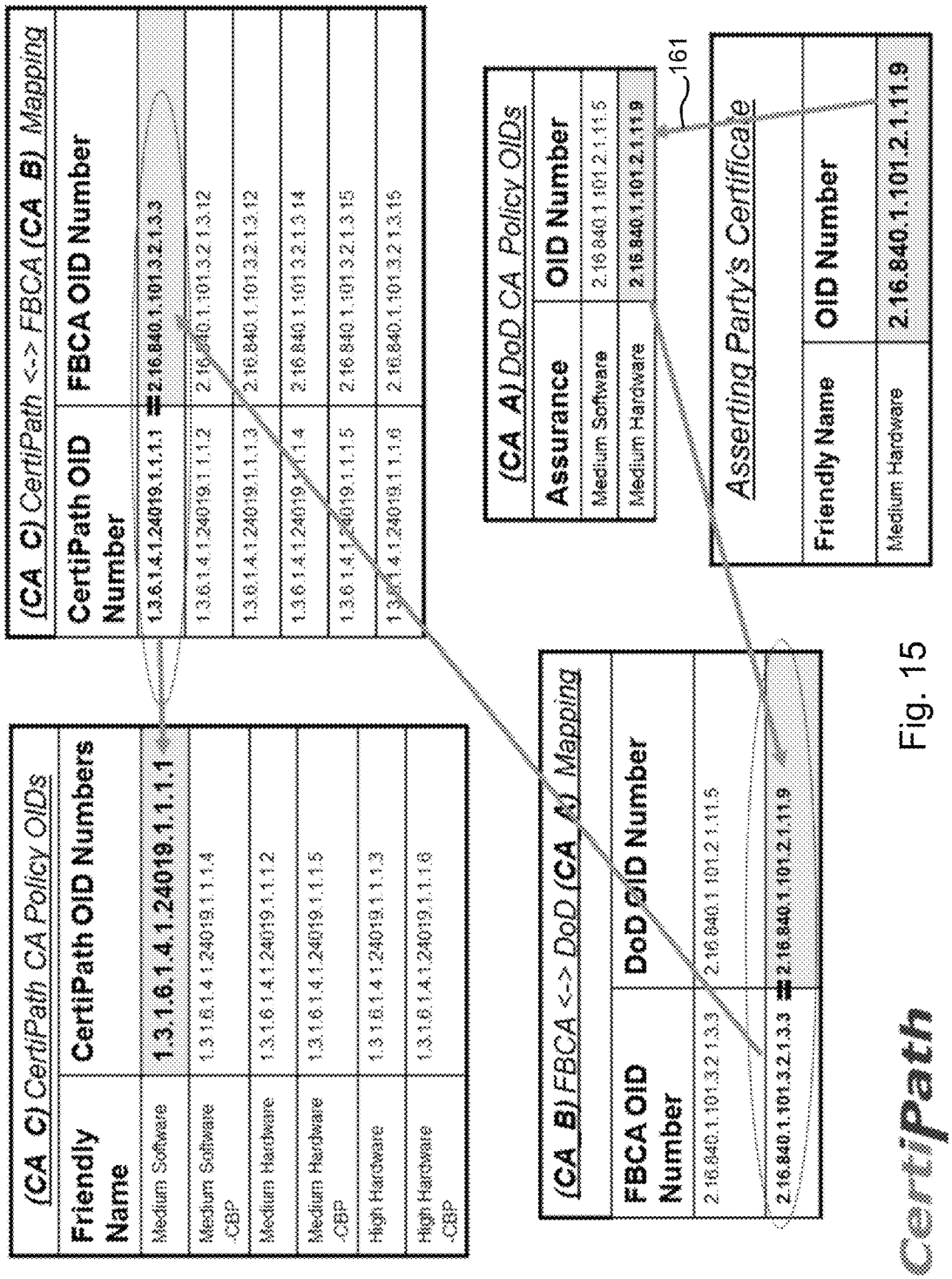
FIG. 15 depicts an exemplary policy map for enabling comparison of certificate policy OIDs of various issuing authorities to each other, according to an exemplary embodiment of the invention.

FIG. 15 shows an exemplary policy mapping for particular certification authority OIDs, namely CertiPath CA policy OIDs, FBCA policy OIDs, and DOD's policy OIDs. These certification authorities may correspond to the previously mentioned CA_A, CA_B, and CA_C certification authorities. In FIG. 15, CertiPath CA may represent an email recipient as well as a trust anchor for the email recipient. FBCA may represent a "Federal Bridge Certification Authority," and the FBCA may have its own policy mapping with respect to the Department of Defense, or DoD, as shown in the bottom left box of FIG. 15. The asserting party may be an employee at DoD who sent an email to an employee at CertiPath. The particular certificate policy OID manifested in the digital signature of the asserting party corresponds to a particular policy OID of the DoD CA, as indicated by arrow 161. Since this policy OID number was previously mapped between the FBCA and DoD, the asserting party's certificate policy OID is also effectively mapped to a particular FBCA policy OID number. Moreover, policy OIDs between CertiPath and FBCA may also be mapped, as shown in the top right box shown in FIG. 15. Accordingly, CertiPath policy OIDs are effectively mapped to DoD policy OIDs, or the asserting party's certificate policy OID since the asserting party is an employee at DoD. Thus, it may be said that DoD's policy OID 2.16.840.1.101.2.1.11.9 equals or corresponds to CertiPath's policy OID 1.3.1.6.1.4.1.24019.1.1.1.1. FIG. 15 shows just one example of how a policy map can enable comparison of certificate policy OIDs of various issuing authorities to each other.

Using an issuing authority policy level map, the SCVP server 101 is able to compare policy OIDs in the certificate to client policies in the client policy database 103. Based upon a comparison of the issuing authority and policy OIDs in the certificate to roots and policy OIDs expressly trusted by the client, which information is stored in client policy database 103, SCVP server 101 is able to specify the level of assurance used to issue the sender's certificate in terms of the trusted roots and policy OIDs specified by the client (e.g., email recipient 130 or an associated client administrator 131).

Figure 12:
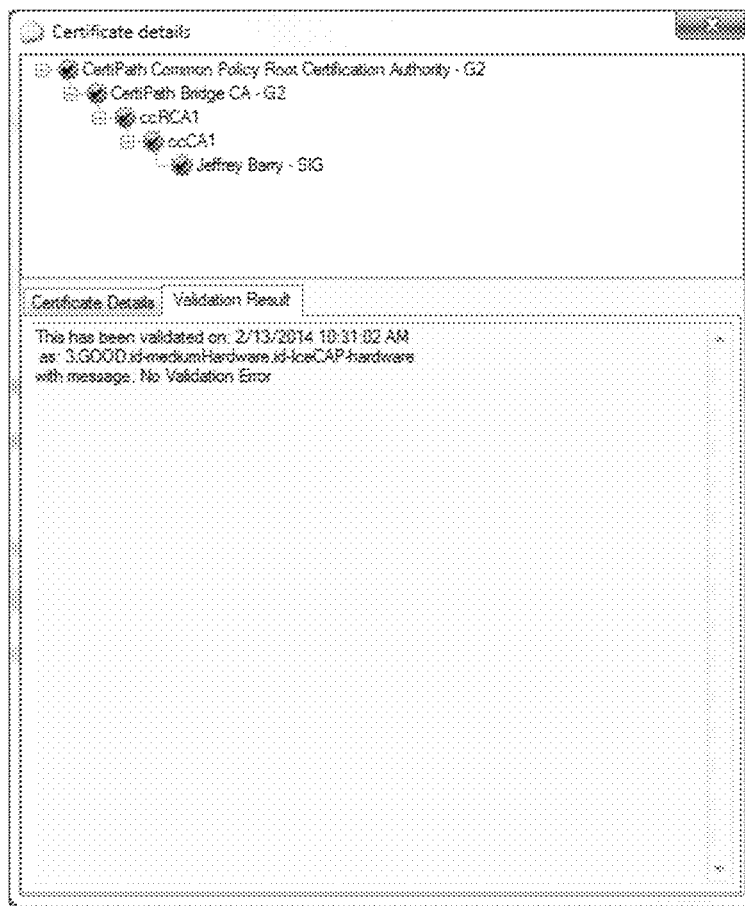
FIGS. 12-13 depict exemplary validation results appended to or included in an SCVP response, according to an exemplary embodiment of the invention.
Figure 13:
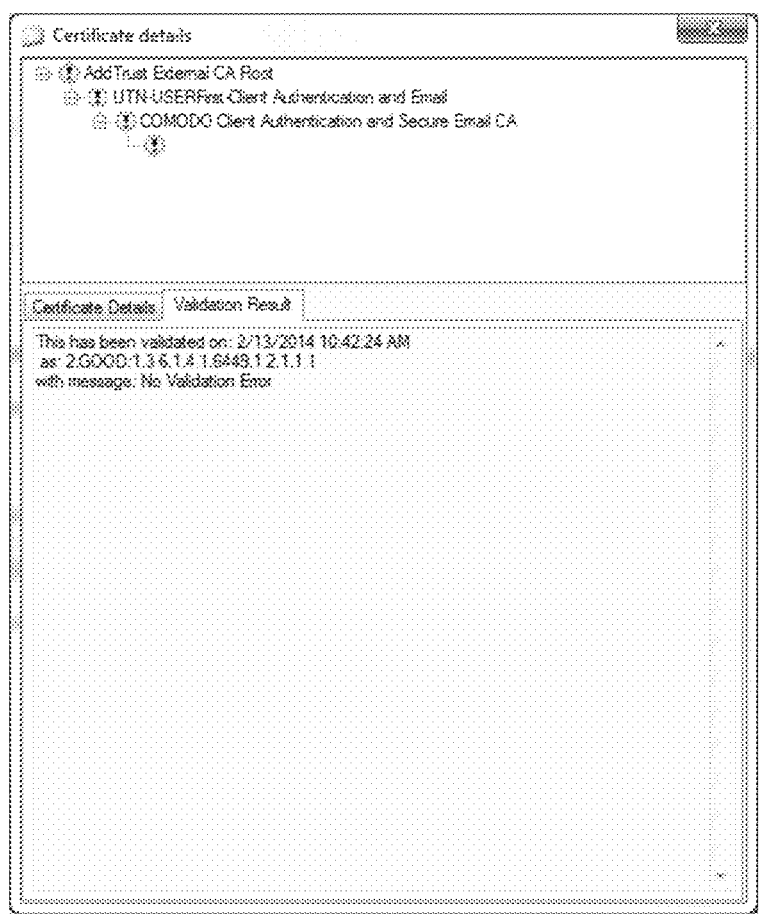

At 590, SCVP server 101 constructs a response that specifies the level of assurance used to issue the sender's digital signature certificate in terms of the client's trusted roots and policy OIDs. The response may include a validation result, which may be in hexadecimal code format or converted into another format. FIGS. 12-13 show exemplary validation results that have been converted from hexadecimal code. The response which comprises the validation result is from the SCVP server 101 and is based upon the comparison at step 580. As shown in FIG. 12, the exemplary validation result may contain the following information: "3:GOOD:id-mediumHardware.id-IceCAP-hardware." The "GOOD" in this information may specify that the certificate is to be trusted by the client, based on the trusted root certificates previously specified by the client (explained below with reference to FIG. 6). The "3" in this information may specify that the policy OIDs in the certificate correspond to a level "3" degree of trust previously specified by the client (again, explained below with reference to FIG. 6). Importantly, this type of information is not conventionally included in a DPV type SCVP response from the SCVP server 101. Rather, a conventional DPV type SCVP response may only indicate whether the certification path is valid or invalid. FIG. 13 shows another exemplary validation result that indicates a "Weak" or intermediate degree of trust. The "GOOD" in this information may also specify that the certificate is to be trusted by the client, based on the trusted root certificates previously specified by the client, and the "2" that precedes "GOOD" in FIG. 13 may specify that the policy OIDs in the certificate correspond to a level "2," or intermediate degree of trust, which may have been previously specified by a client administrator. Referring back to 590, SCVP server may take the constructed response, then sign and send to response to relying party 130.

At 595, SCVP module 304 at the relying party 130 may receive the response from the SCVP server 101. SCVP module 304 may interpret the response to determine whether the certification path is valid or invalid. However, SCVP module 304 may not interpret the information that is typically not included in an SCVP response. All or a portion of the response may be relayed to analysis module 306. Analysis module 306 may analyze the response, particularly the information that is not typically included in an SCVP response. For example, analysis module 306 may analyze the information: "3:GOOD:id-mediumHardware.id-IceCAP-hardware." Analysis module 306 may interpret the "GOOD" in the response as specifying that the certificate is to be trusted by the client/relying party 130, based on the trusted root certificates previously specified by the client (or an administrator 131 associated with the client). Analysis module 306 may also interpret the "3" in the response as specifying that the policy OIDs in the sender's certificate correspond to a level "3" degree of trust previously specified by the client (or an administrator 131 associated with the client). After evaluating the response, the process may continue to 599.

At 599, analysis module 306 may instruct email module 310 to display the appropriate trustworthiness level. In the present example involving "3:GOOD:id-mediumHardware.id-IceCAP-hardware," the appropriate trustworthiness level is "3" which may correspond to a graphical representation signifying a high level of trust. An exemplary graphical representation for a level "3" or high level of trust/assurance may include a checkmark followed by a number of bars, which may be colored, such as green-colored bars. Though not shown, the checkmark (or the area surrounding the checkmark) and the bars may be color-coded such that a user/email recipient 130 may readily determine whether the identity of the sender can be trusted. For example, green bars and/or a checkmark may correspond to a level "3" or high level of trust/assurance; yellow bars and/or an exclamation point may correspond to a level "2") or intermediate level of trust/assurance; red bars and/or an "X" may correspond to a level "1" or a low level of trust/assurance. In this manner, a client or email recipient may readily know the degree of trust that can be attributed to the digital signature and the identity of the email sender 105. FIG. 14 shows an exemplary graphical representation for a low level of trust/assurance, and includes an "X" followed by a number of bars, which may be colored, such as red-colored bars.

Figure 6:
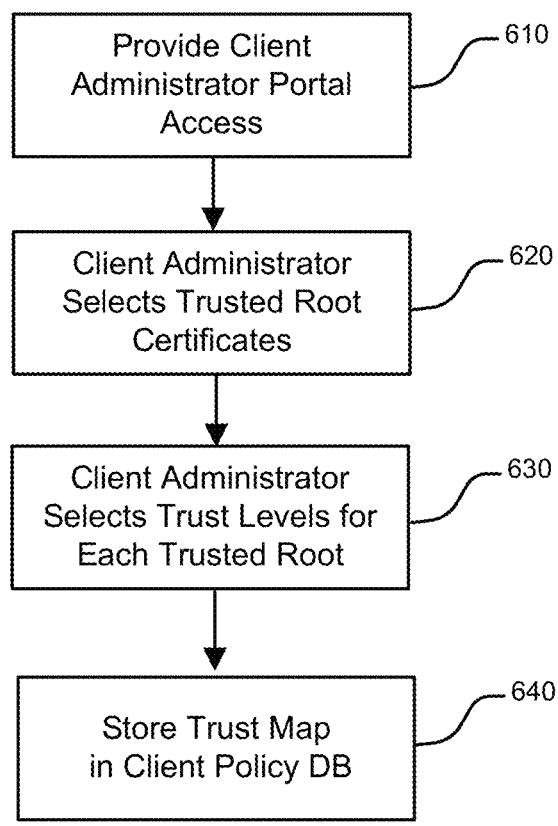
FIG. 6 depicts an illustrative flowchart of identifying trusted roots and policy OIDs, according to an exemplary embodiment of the invention.

Referring to FIG. 6, an illustrative flowchart of a method for specifying trusted roots and corresponding trust levels for root/issuer policy OIDs is shown. This exemplary method 600 is provided by way of example, as there are a variety of ways to carry out methods according to the present disclosure. The method 600 shown in FIG. 6 can be executed or otherwise performed by one or a combination of various systems and modules. The method 600 described below may be carried out by system 100 shown in FIG. 1 and various elements of the system 100 are referenced in explaining the exemplary method of FIG. 6. Each block shown in FIG. 6 represents one or more processes, decisions, methods or subroutines carried out in exemplary method 600, and these processes, decisions, methods or subroutines are not necessarily carried out in the specific order outlined in FIG. 6, nor are each of them required. Referring to FIG. 6, exemplary method 600 may begin at block 610.

At 610, SCVP server 101 may provide client administrator 131 access to a portal hosted with, or separately from, the SCVP server 101. Client administrator 131 may be associated with email recipient 130 such that roots/issuers and policy OIDs trusted by the client administrator 131 are also trusted by email recipient 130. In an alternative embodiment, the client administrator 131 may be associated with email sender 105 such that roots/issuers and policy OIDs trusted by the client administrator 131 are also trusted by email sender 105. Client administrator 131 may be an IT administrator at an entity that employs a user associated with email recipient 130 (or email sender 105). The portal may allow the client administrator 131 to specify which trust anchors or roots and corresponding policy OIDs of those trust anchors or roots are trusted by the client administrator 131. Exemplary portal screen shots are shown in FIGS. 8-11.

Figure 8:
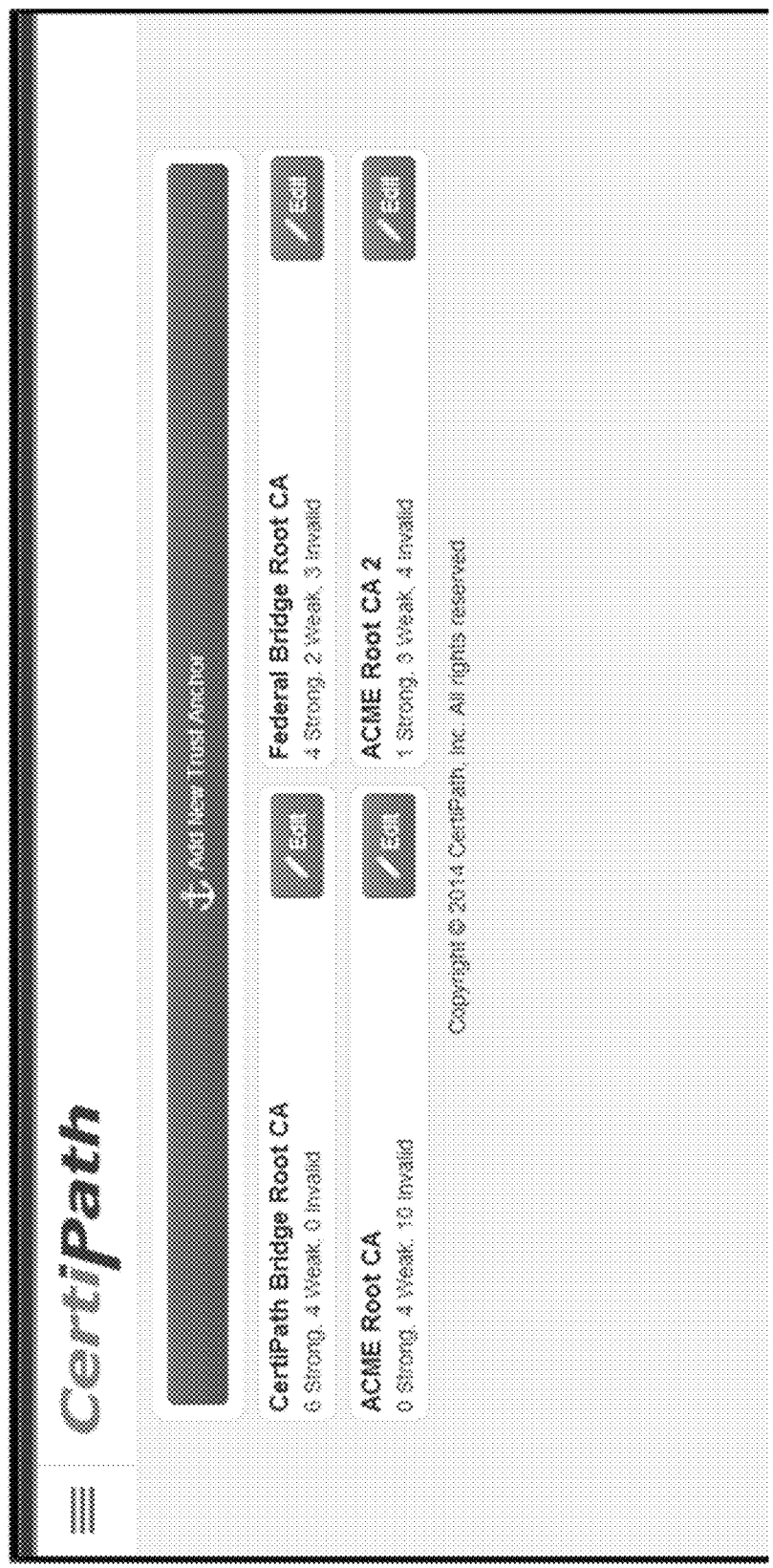
Figure 9:
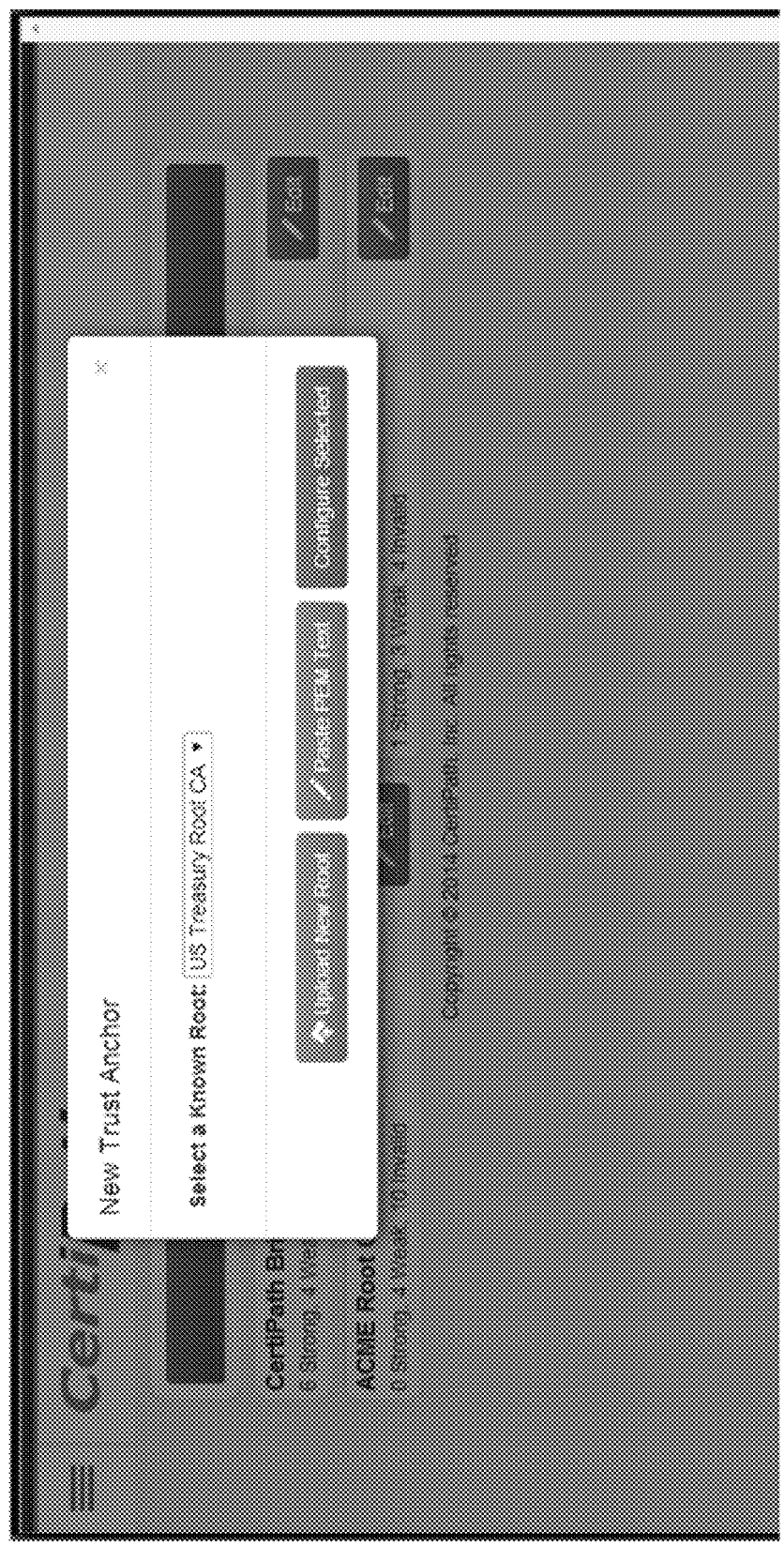

At 620, client administrator 131 may select which roots/trust anchors are to be trusted by email recipient 130 (or email sender 105). This may be performed by uploading one or more certification authority certificates (Trusted Roots or Trust Anchors). FIG. 8 shows a home screen of an exemplary portal where a client administrator 131 may upload a new certification authority certificate and where previously uploaded certification authority certificates may be listed. FIG. 9 shows how a new trust anchor or certification authority certificate may be uploaded. In this case, the "US Treasury Root CA" is selected as a new root or trust anchor from a drop down list commonly known roots. Once one or more trusted root certificates have been identified and/or uploaded to the SCVP server 101 via the portal, the process may continue to 630.

Figure 10:
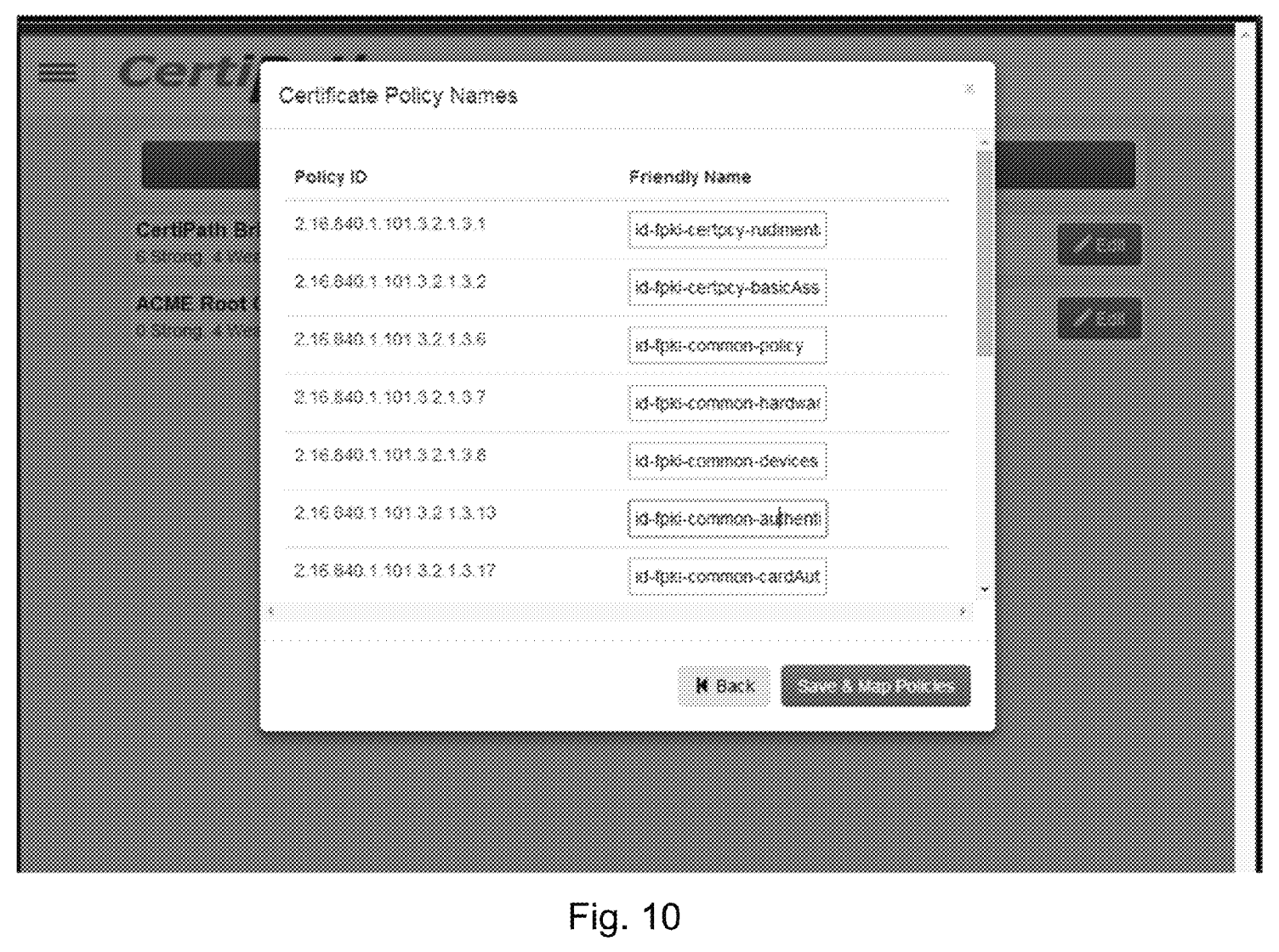
Figure 11:
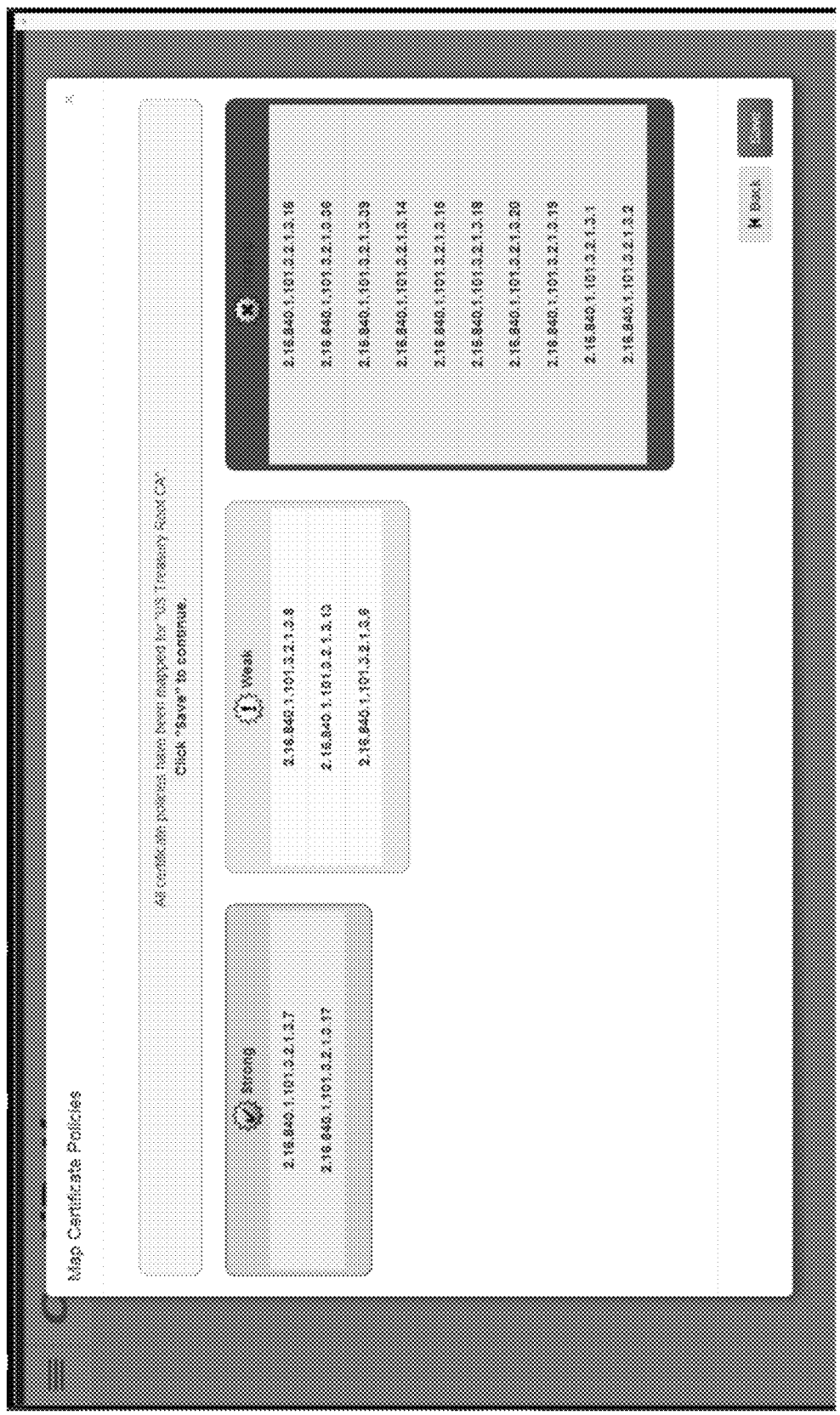

At 630, the client administrator 131 may specify which OIDs of the trusted root are to be trusted and to what degree. As shown in FIG. 10, the portal may guide the client administrator 131 such that the client administrator may configure the OIDs to have friendly names for ease of understanding. Client administrator 131 may select a certification authority in order to specify which policy OIDs of the certification authority are to be trusted. As shown in FIG. 11, the US Treasury Root CA has been selected and client administrator 131 may be permitted to identify policy OIDs that are to be trusted to a high degree (e.g., "Strong" or "Green OIDs"), policy OIDs that are to be trusted to an intermediate degree (e.g., "Weak" or "Yellow OIDs"), and policy OIDs that are not to be trusted to any degree (e.g., "Invalid" or "Red OIDs"). In this manner, policy OIDs may be categorized per client administrator wishes. Default categories may be displayed for selection by the client administrator 131. In the present example, three categories are displayed as potential trust levels for policy OIDs (Strong, Weak, or Invalid; or "Green OIDs", "Yellow OIDs", and "Red OIDs"), but there is no limit to the number of trust categories. The portal may or may not permit a client administrator 131 to specify policy OIDs that are to be trusted at a low degree (e.g., "Red OIDs"). Policy OIDs that are not expressly selected to be "Green OIDs" or "Yellow OIDs" may be interpreted by the SCVP server 101 to be "Red OIDs" if the trust categories displayed by default represent at least some degree of trust. Accordingly, policy OIDs that are to be trusted at a low degree may be understood based on express selections of policy OIDs that are to be selected at a high or intermediate degree(s).

Once client administrator 131 opts to select "Strong" OIDs, another window may pop-up listing the policy OIDs of the selected certification authority (in this example, US Treasury Root CA). The policy OIDs may be listed in a pop-up window or directly within the main portal window, for example. The listed policy OIDs are associated with the certification authority certificate previously uploaded. Policy OIDs are associated with certification authority certificates in one of two ways by the portal: either by explicit listing by the client administrator or through path discovery or automated population done by the SCVP server or another component in the system. The policy OIDs may be represented by the last numeral in each row of OIDs. Upon selecting the trusted policy OIDs, client administrator 131 may select "Save," as shown in FIG. 11. The selected policy OIDs may be listed in the relevant trust category. Client administrator 131 may also specify other categories of policy OIDs. Client administrator 131 may opt to disable an intermediate or low categories, such that only highly trusted policy OIDs are specified. In other embodiments, client administrator 131 may select other levels of trusted policy OIDs, which levels correspond to varying graphical representations presented to email recipient 130 upon receiving an email. The number of levels and the types of corresponding graphical representations may be configured by the client administrator or may be established by SCVP server 101 hosting the portal. Once client administrator 131 has selected the trusted root certificates and one or more corresponding trusted policy OIDs, and indicated any relevant category of such trusted policy OIDs, the process may continue to 640.

At 640, selections of the client administrator 131 may be stored in client policy database 103. SCVP server 101 may refer to this client policy database 131 upon receiving an SCVP request to determine which roots and policy OIDs are trusted (or not trusted) by the email recipient 130. Accordingly, SCVP server 101 can determine which degree of trust information to append to the SCVP response.

As explained above, the present invention may be used to validate an email sender's identity after receiving an email, and/or to validate an email recipient's identity before sending an email. Referring to FIG. 7, an illustrative flowchart of a method for validating an email recipient's identity is shown. Exemplary method 700 is provided by way of example, as there are a variety of ways to carry out methods according to the present disclosure. The method 700 shown in FIG. 7 can be executed or otherwise performed by one or a combination of various systems and modules. The method 700 described below may be carried out by system 100 shown in FIG. 1, SCVP server 101 shown in FIG. 2, and email sender 105 shown in FIG. 4, by way of example, and various elements of the system 100, SCVP server 101, and email sender 105 are referenced in explaining the exemplary method of FIG. 7. Each block shown in FIG. 7 represents one or more processes, decisions, methods or subroutines carried out in exemplary method 700, and these processes, decisions, methods or subroutines are not necessarily carried out in the specific order outlined in FIG. 7, nor are each of them required. Referring to FIG. 7, exemplary method 700 may begin at block 710.

At 710, the email sender 105 may select an email to be encrypted before or after entering an email recipient's email address. At 720, SCVP module 404 may retrieve the intended email recipient's public key certificate. Typically, the email recipient's public key certificate would be used to encrypt the email from email sender 105. However, before simply encrypting the email, the email sender 105 may wish to verify the identity of the intended email recipient 130.

At 730, SCVP module 404 of email sender 105 may prepare and submit an SCVP request and SCVP server 101 may receive the SCVP request from email sender 105 via network 102. The purpose of the SCVP request may be to have SCVP server 101 construct a certification path using the intended email recipient's public key certificate, as well as to have the SCVP server 101 construct degree of trust information. The SCVP request may comprise the intended email recipient's public key certificate that the email sender 105 is attempting to verify from the email sender 105, from which the certification path is to begin.

At 740, SCVP server 101 may construct a certification path for the intended email recipient's public key certificate that may be used to encrypt the email. The SCVP server 101 searches its database 204 of X.509 certificates to discover issuers of the public key certificate, including the root or trust anchor, and any intermediate certification authorities (i.e., issuing CA or signing CA), down to the end-entity (in this case, the intended email recipient 130). After the SCVP server 101 constructs a certification path, the process may continue to 750.

At 750, the SCVP server 101 may determine whether the constructed certification path is valid. A certification path may be determined to be invalid if it is incomplete, if the certificate has expired, if the certificate has been revoked, or if a name constraint has been violated, for example. If SCVP server 101 determines that the certification path is invalid, then the process may continue to 755 and ultimately to 770. If SCVP server 101 determines that the certification path is valid, then the process may continue to 760.

At 760, SCVP server 101 may compare policy OIDs in the intended recipient's public key certificate to policy OIDs expressly trusted by the email sender 105 (or an entity associated with email sender 105). The expressly trusted policy OIDs of the email sender 105 may be recorded in the client policy database(s) 103, as explained above with reference to FIG. 6. The policy OIDs in the intended email recipient's public key certificate may be compared to the policy OIDs expressly trusted by the email sender 130 (or client administrator 131) using an issuing authority level mapping. As explained above, the issuing authority level mapping may be constructed by a bridge and referred to by the SCVP server 101 for the purpose of preparing degree of trust information to append to the SCVP response. In other words, by using an issuing authority policy level map, the SCVP server 101 is able to compare policy OIDs in the intended recipient's public key certificate to client policies in the client policy database 103. Based upon a comparison of the issuing authority and policy OIDs in the public key certificate to roots and policy OIDs expressly trusted by the email sender 105 (which information is stored in client policy database 103 as explained above), SCVP server 101 is able to specify the level of assurance used to issue the (intended) email recipient's public key certificate in terms of the email sender's trusted roots and policy OIDs.

An SCVP response in this encryption situation may contain information indicating whether the (intended) email recipient's certification path is valid or invalid. Additionally, however, at 770, SCVP server 101 constructs a response that also includes information on the level of assurance used to issue the (intended) email recipient's public key certificate in terms of the email sender's trusted roots and policy OIDs. The response may include a validation result, which may be in hexadecimal code format or converted into another format. Also at 770, SCVP server may take the constructed response, then sign and send to response to email sender 105.

At 780, SCVP module 404 at the email sender 105 may receive the response from the SCVP server 101. SCVP module 404 may interpret the response to determine whether the certification path is valid or invalid. However, SCVP module 404 may not interpret the information that is typically not included in an SCVP response. All or a portion of the response may be relayed to analysis module 406. Analysis module 406 may analyze the response, particularly the information that is not typically included in an SCVP response. Specifically, analysis module 406 may analyze the validation result containing the degree of trust information. After evaluating the response, the process may continue to 790.

At 790, analysis module 406 may instruct email module 410 to display the appropriate trustworthiness level. In one example, if the degree of trust information corresponds to a high degree of trust, as specified by the email sender 105 (or an administrator associated with the email sender 105), then the intended email recipient's name or email address may turn green, for example. Corresponding graphical representations may be displayed for an intermediate level of trust/assurance or a low/none level of trust/assurance. For example, the intended email recipient's name or email address may turn yellow or red, based on the level of trust attributable to the binding between the public key distributed via that certificate and the identity/attributes of the "subject" contained in that certificate (in this case, the intended email recipient 130). In this manner, an email sender 105 (or a user thereof) may readily know the degree of trust that can be attributed to the public key certificate and the identity of the email recipient 130.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method comprising:
   providing a Server-based Certificate Validation Protocol (SCVP) server configured to:
   receive, from a relying party, an SCVP request, the SCVP request comprising an end-entity certificate issued to an asserting party,
   compare policy object identifier(s) (OIDs) asserted in the end-entity certificate to policy OIDs expressly trusted by the relying party to determine a degree of trust information, the degree of trust information representing how likely the asserting party is who they claim to be,
   wherein the policy OIDs asserted in the end-entity certificate correspond to policies of a certification authority that issued the end-entity certificate to the asserting party, wherein the policy of the certification authority specifies identity-proofing practices followed by the certification authority when issuing the end-entity certificate to the asserting party, the identity-proofing practices comprise verifying the identity of the asserting party per the policies of the certification authority, before the certification authority issues the end-entity certificate to the asserting party,
   send the degree of trust information to the relying party in response to the SCVP request, the degree of trust information being based on the comparison of policy OIDs;
   displaying, at an email client, a graphical representation of the degree of trust information,
   wherein the degree of trust information represents a level of trust attributable to a binding between a public key distributed via the end-entity certificate and the identity of the asserting party.

2. The method of claim 1, wherein the relying party is an email recipient and the SCVP request is sent to the SCVP server upon receipt of an email from the asserting party.

3. The method of claim 2, wherein the end-entity certificate is a digital signature certificate and the email from the asserting party includes a digital signature.

4. The method of claim 1, wherein the relying party is an email sender and the SCVP request is sent to the SCVP server upon a selection to encrypt an email by the email sender.

5. The method of claim 4, wherein the end-entity certificate is an encryption certificate issued to an intended email recipient.

6. The method of claim 1, wherein the SCVP server compares policy OIDs asserted in the end-entity certificate to policy OIDs expressly trusted by the relying party by referring to a client policy database where the policy OIDs expressly trusted by the relying party are identified.

7. The method of claim 6, wherein a client administrator associated with the relying party identifies which policy OIDs are to be expressly trusted by the relying party, and wherein identifiers of the expressly trusted policy OIDs are stored in the client policy database.

8. The method of claim 1, wherein an analysis module at a workstation of the relying party analyzes the degree of trust information to determine which graphical representation to display to the relying party at the workstation.

9. The method of claim 1, wherein the degree of trust information comprises a graphical user interface (GUI) messaging extension.

10. The method of claim 1, wherein the comparing policy OIDs asserted in the end-entity certificate to the policy OIDs expressly trusted by the relying party comprises using an issuing authority level mapping that compares policy OIDs of one or more certification authorities, including the certification authority that issued the end-entity certificate to the asserting party, and identifies which policy OIDs of the one or more certification authorities correspond to one or more of the policy OIDs expressly trusted by the relying party.

11. Non-transitory computer readable media containing program instructions for causing a computer to perform the following actions:
    receive, from a relying party, a Server-based Certificate Validation Protocol (SCVP) request, the SCVP request comprising an end-entity certificate issued to an asserting party;
    compare policy object identifier(s) (OIDs) asserted in the end-entity certificate to policy OIDs trusted by the relying party to determine a degree of trust information, the degree of trust information representing how likely the asserting party is who they claim to be, wherein the policy OIDs asserted in the end-entity certificate correspond to policies of a certification authority that issued the end-entity certificate to the asserting party, wherein the policy of the certification authority specifies identity-proofing practices followed by the certification authority when issuing the end-entity certificate to the asserting party the identity-proofing practices comprise verifying the identity of the asserting party per the policies of the certification authority, before the certification authority issues the end-entity certificate to the asserting party;
    send the degree of trust information to the relying party in response to the SCVP request, the degree of trust information being based on the comparison of policy OIDs;
    displaying, at an email client, a graphical representation of the degree of trust information,
    wherein the degree of trust information represents a level of trust attributable to a binding between a public key distributed via the end-entity certificate and the identity of the asserting party.

12. A system comprising:
    a Server-based Certificate Validation Protocol (SCVP) server comprising at least one processor and a memory, the SCVP server configured to:
    receive, from a relying party, an SCVP request, the SCVP request comprising an end-entity certificate issued to an asserting party,
    compare policy object identifier(s) (OIDs) asserted in the end-entity certificate to policy OIDs expressly trusted by the relying party to determine a degree of trust information, the degree of trust information representing how likely the asserting party is who they claim to be, wherein the policy OIDs asserted in the end-entity certificate correspond to policies of a certification authority that issued the end-entity certificate to the asserting party, wherein the policy of the certification authority specifies identity-proofing practices followed by the certification authority when issuing the end-entity certificate to the asserting party, the identity-proofing practices comprise verifying the identity of the asserting party the policies of the certification authority, before the certification authority issues the end-entity certificate to the asserting party, send the degree of trust information to the relying party in response to the SCVP request, the degree of trust information being based on the comparison of policy OIDs;

an email client configured to display a graphical representation of the degree of trust information, wherein the degree of trust information represents a level of trust attributable to a binding between a public key distributed via the end-entity certificate and the identity of the asserting party.

13. The system of claim 12, wherein the relying party is an email recipient and the SCVP request is sent to the SCVP server upon receipt of an email from the asserting party.

14. The system of claim 13, wherein the end-entity certificate is a digital signature certificate and the email from the asserting party includes a digital signature.

15. The system of claim 12, wherein the relying party is an email sender and the SCVP request is sent to the SCVP server upon a selection to encrypt an email by the email sender.

16. The system of claim 15, wherein the end-entity certificate is an encryption certificate issued to an intended email recipient.

17. The system of claim 12, wherein the SCVP server compares policy OIDs asserted in the end-entity certificate to policy OIDs expressly trusted by the relying party by referring to a client policy database where the policy OIDs expressly trusted by the relying party are identified.

18. The system of claim 17, wherein a client administrator associated with the relying party identifies which policy OIDs are to be expressly trusted by the relying party, and wherein identifiers of the expressly trusted policy OIDs are stored in the client policy database.

19. The system of claim 12, wherein an analysis module at a workstation of the relying party analyzes the degree of trust information to determine which graphical representation to display to the relying party at the workstation.

20. The system of claim 12, wherein the degree of trust information comprises a graphical user interface (GUI) messaging extension.

21. The system of claim 12, wherein the comparing policy OIDs asserted in the end-entity certificate to the policy OIDs expressly trusted by the relying party comprises using an issuing authority level mapping that compares policy OIDs of one or more certification authorities, including the certification authority that issued the end-entity certificate to the asserting party, and identifies which policy OIDs of the one or more certification authorities correspond to one or more of the policy OIDs expressly trusted by the relying party.

22. A system comprising:
a Server-based Certificate Validation Protocol (SCVP) server comprising at least one processor and a memory, the SCVP server configured to:
receive an SCVP request comprising an end-entity certificate issued to an asserting party,
compare policy object identifier(s) (OIDs) asserted in the end-entity certificate to policy OIDs trusted by a relying party to determine a degree of trust information, the degree of trust information representing how likely the asserting party is who they claim to be, wherein the policy OIDs asserted in the end-entity certificate correspond to policies of a certification authority that issued the end-entity certificate to the asserting party, wherein the policy of the certification authority specifies the identity-proofing practices followed by the certification authority when issuing the end-entity certificate to the asserting party, the identity-proofing practices comprise verifying the identity of the asserting party per the policies of the certification authority, before the certification authority issues the end-entity certificate to the asserting party,
send the degree of trust information to the relying party in response to the SCVP request,
displaying, at an email client, a graphical representation of the degree of trust information,
the degree of trust information being based on the comparison of policy OIDs;
wherein the degree of trust information represents a level of trust attributable to a binding between a public key distributed via the end-entity certificate and the identity of the asserting party,
and
wherein the relying party is an email recipient and the SCVP request is sent to the SCVP server upon the asserting party sending an email to the relying party.

* * * * *